United States Patent Office 3,600,350
Patented Aug. 17, 1971

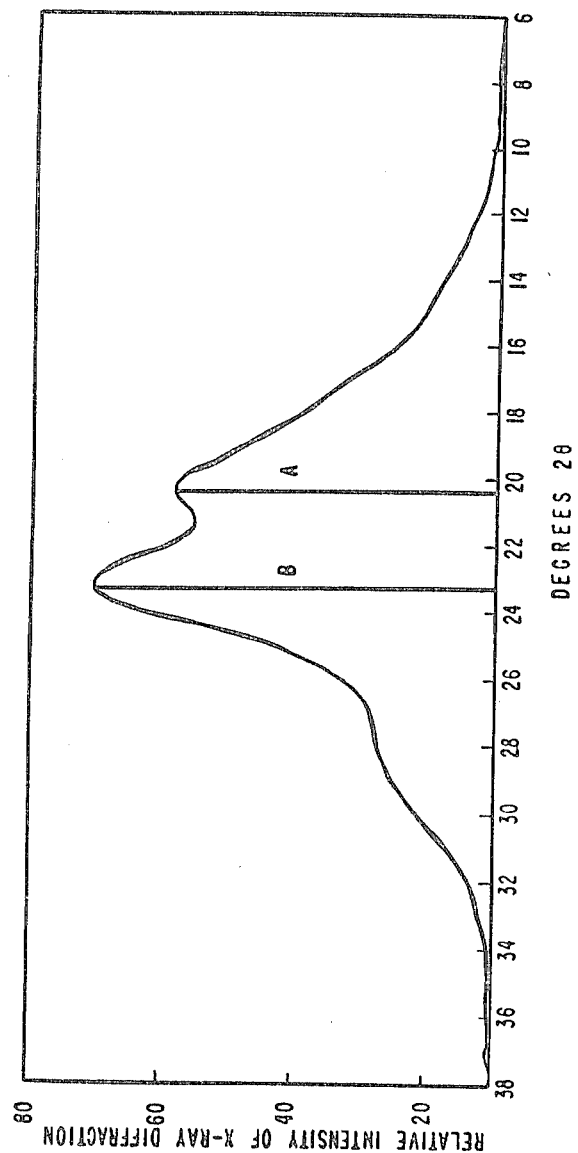

3,600,350
POLY(p-BENZAMIDE) COMPOSITION, PROCESS AND PRODUCT
Stephanie Louise Kwolek, Wilmington, Del., assignor to E. I. du Pont de Nemours and Company, Wilmington, Del.
Continuation-in-part of application Ser. No. 644,851, June 9, 1967, which is a continuation-in-part of application Ser. No. 556,934, June 13, 1966. This application Apr. 20, 1970, Ser. No. 30,090
Int. Cl. C08g 20/00, 51/44
U.S. Cl. 260—32.6                                      21 Claims

ABSTRACT OF THE DISCLOSURE

High molecular weight polymers consisting essentially of recurring units of the formula

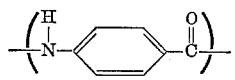

and certain copolymers thereof are useful for the production of fibers having a high initial modulus.

CROSS-REFERENCE TO RELATED APPLICATIONS

This application is a continuation-in-part of my copending application Ser. No. 644,851, filed June 9, 1967 now abandoned, which in turn is a continuation-in-part of my application Ser. No. 556,934, filed June 13, 1966, now abandoned.

DETAILED DESCRIPTION

This invention relates to novel high-melting, high molecular weight, linear polyamides and to spinning useful shaped articles prepared therefrom.

It is pointed out by Dr. H. F. Mark in J. Poly Sci. Part C, N-9, pages 1-33 (1965), that synthetic materials such as rayon, cellulose acetate, the conventional nylons, polyesters, vinyls, acrylics and polyvinyls fall within a modulus range delineated by elastomeric spandex type fibers and highly oriented aromatic polyamides. This modulus range is from 100 p.s.i. (70307 kg./m.$^2$) to about 700,000 p.s.i. (4921.5×10$^5$ kg./m.$^2$). Fibers having a high modulus are one object of the present invention. However, Dr. Mark further states that a structural polymer should have a favorable combination of properties such as high modulus of rigidity, high softening or melting point, high tensile strength, high elongation to break, high solvent resistance and high resistance to degradation by heat. Another object of this invention is to provide polymer, film and fiber having a plurality of such qualities. These and other objects will be apparent from the following description.

Homopolymer and its preparation

In accordance with one aspect of the invention, there is provided a high molecular weight spbstantially homopolymeric poly(p-benzamide) consisting essentially of recurring units of the formula

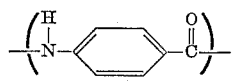  Formula I

In the inherent viscosity range of from about 0.8 to about 2.5 (measured as described hereinafter) this polymer is useful for the production of fibers. At values of inherent viscosity as low as about 0.7, it is useful for the production of films, fibrids, and coatings. These uses require the polymer to be preliminarily in the form of a dope.

The dopes of the polyamides of the invention can be extruded, cast or, if desired, fibridated. The most stable dopes to be used for extrusion of the homopolyamide referred to above into filaments or casting into films, contain, on a weight basis, between 4 and 30% of polymer, preferably 5 to 15%, from 3 to 22% lithium chloride (LiCl), and the remainder tetramethylurea (TMU). At least 0.5 mol of LiCl should be present per repeating unit of polymer. However, the presence of LiCl is not necessary if the dope is used within a reasonable period after preparation. Thus, to assure that the dope is in proper condition for dry- or wet-spinning, either the polymer is prepared in TMU or in TMU-LiCl optionally followed by complete or partial neutralization of the by-product acid, and spun directly (coupled process). It is not necessary that the by-product acid be neutralized, except that it is found to be corrosive to the spinning equipment. In an alternate procedure, the polymer is first prepared and isolated, then combined with TMU-LiCl all as indicated below.

The essentially homopolymeric poly(benzamide) in this invention may readily be obtained by certain polymerization techniques from suitable monomers. For example, it may be obtained by the low temperaure solution polymerization of p-aminobenzoyl halide salts of the formula

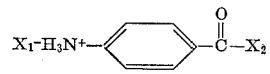  Formula II wherein $X_1$ represents a member selected from the group consisting of arylsulfonate, alkylsulfonate, acid sulfate, and halogen radicals, preferably bromide or chloride radicals, and $X_2$ represents a halogen radical, preferably bromide or chloride. p-Aminobenzoyl chloride hydrochloride is the monomer preferred. Other monomers suitable for this purpose are p-aminobenzoyl bromide hydrobromide, p-aminobenzoyl chloride hydrobromide, p-aminobenzoyl chloride methanesulfonate, p-aminobenzoyl chloride benzenesulfonate, p-aminobenzoyl chloride toluenesulfonate, p-aminobenzoyl bromide ethanesulfonate, and p-aminobenzoyl chloride sulfate. The preferred p-aminobenzoyl chloride hydrochloride may be prepared in high yield from an ethereal solution of p-thionylaminobenzoyl chloride by the general procedure of Graf and Langer, J. prakt. Chem. 148, 161 (1937) under anhydrous conditions. The drying and anhydrous storage of this monomer are preferably performed under room temperature conditions because of the tendency for the compound to polymerize at higher temperatures.

Copolyamides and their preparation

In accordance with another aspect of the invention, there is provided a high molecular weight copolyamide consisting essentially of recurring units of the formula A  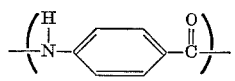

and

B  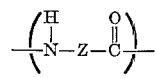

wherein Z represents a divalent organic radical and preferably has the significance set forth below, the A units constitute at least about 80% on a mole basis and the B units constitute up to about 20% on a mole basis. The copolyamides may be derived from a major portion of a Formula II salt copolymerized with a minor portion of at least one hydrohalide salt selected from the class represented by the formula

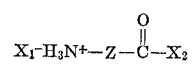  Formula III wherein $X_1$ and $X_2$ have the significance set forth hereinabove, and wherein Z represents a m-phenylene radical or a member of the group consisting of m-phenylene and p-phenylene radicals which bear one or more substituents (the same or different) selected from the group of halogen, lower alkyl, lower alkoxy, isopropenyl, methylthio, ethylthio, cyano, nitro, acetyl, carbomethoxy, carboethoxy, acetamido, dimethylamino, diethylamino, ethylsulfonyl, dimethylcarbamoyl, diethylcarbamoyl, methylsulfonyl, dimethylsulfamoyl, diethylsulfamoyl, and fluorosulfonyl radicals, or a structure of the type

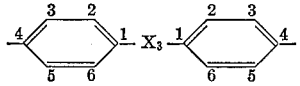

which may bear one or more substituents selected from the group of halogen, lower alkyl, and lower alkoxy radicals and where the terminal bonds are attached to 3, 4 or 5 positions and wherein $X_3$ is a single bond,

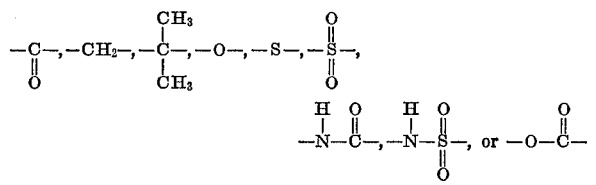

Formula III comonomers preferred for the preparation of the copolyamides include m-aminobenzoyl chloride hydrochloride,
m-aminobenzoyl bromide hydrobromide,
2-methyl-3-aminobenzoyl chloride hydrochloride,
p-aminophenyl p-(chlorocarbonyl)-phenyl sulfone hydrochloride,
p-aminophenyl p-(chlorocarbonyl) phenyl ether hydrochloride,
p-amino-p-(chlorocarbonyl) biphenyl hydrochloride,
m-amino-p-(chlorocarbonyl) benzophenone hydrochloride,
p-(chlorocarbonyl) phenyl p-(amino) benzoate hydrochloride,
3-fluoro-4-aminobenzoyl chloride hydrochloride,
2-chloro-4-aminobenzoyl chloride hydrochloride,
2,6-dichloro-4-aminobenzoyl chloride hydrochloride,
3-bromo-4-aminobenzoyl chloride hydrochloride,
2,6-dibromo-4-aminobenzoyl chloride hydrochloride,
3-iodo-4-aminobenzoyl chloride hydrochloride,
2-fluoro-4-aminobenzoyl chloride hydrochloride,
2,3-dimethyl-4-aminobenzoyl chloride hydrochloride,
2,6-dimethyl-4-aminobenzoyl chloride hydrochloride,
3-ethyl-4-aminobenzoyl chloride hydrochloride,
2-nitro-4-aminobenzoyl chloride hydrochloride,
3-ethoxy-4-aminobenzoyl chloride hydrochloride,
2-ethoxy-5-nitro-4-aminobenzoyl chloride hydrochloride,
2-propoxy-4-aminobenzoyl chloride hydrochloride,
2-isobutoxy-4-aminobenzoyl chloride hydrochloride,
2-sec.butoxy-4-aminobenzoyl chloride hydrochloride,
3-propoxy-4-aminobenzoyl chloride hydrochloride,
3-isopropoxy-4-aminobenzoyl chloride hydrochloride,
3-butoxy-4-aminobenzoyl chloride hydrochloride,
2-methylthio-4-aminobenzoyl chloride hydrochloride,
2-ethylthio-4-aminobenzoyl chloride hydrochloride,
2,5-dimethyl-4-aminobenzoyl chloride hydrochloride,
3,5-dimethyl-4-aminobenzoyl chloride hydrochloride,
2,5-dimethyl-4-aminobenzoyl chloride hydrochloride,
2-ethylsulfonyl-4-aminobenzoyl chloride hydrochloride,
2-dimethylsulfamoyl-4-aminobenzoyl chloride hydrochloride,
2,3,5,6-tetramethyl-4-aminobenzoyl chloride hydrochloride,
4-methyl-3-aminobenzoyl chloride hydrochloride,
4-ethyl-3-aminobenzoyl chloride hydrochloride,
4-isopropyl-3-aminobenzoyl chloride hydrochloride,
4-isopropenyl-3-aminobenzoyl chloride hydrochloride,
4-tert.butyl-3-aminobenzoyl chloride hydrochloride,
2,6-dimethyl-3-aminobenzoyl chloride hydrochloride,
2-chloro-3-aminobenzoyl chloride hydrochloride,
4-chloro-3-aminobenzoyl chloride hydrochloride,
5-bromo-3-aminobenzoyl chloride hydrochloride,
2-iodo-3-aminobenzoyl chloride hydrochloride,
2,5-dichloro-3-aminobenzoyl chloride hydrochloride,
4,6-dichloro-3-aminobenzoyl chloride hydrochloride,
5-nitro-3-aminobenzoyl chloride hydrochloride,
4-dimethylamino-3-aminobenzoyl chloride hydrochloride,
2-butoxy-3-aminobenzoyl chloride hydrochloride,
2-isopropoxy-3-aminobenzoyl chloride hydrochloride,
4-propoxy-3-aminobenzoyl chloride hydrochloride,
2-acetyl-3-aminobenzoyl chloride hydrochloride,
4-methylthio-3-aminobenzoyl chloride hydrochloride,
4-ethylthio-3-aminobenzoyl chloride hydrochloride, In still another aspect of the invention, there is provided a high molecular weight copolyamide consisting essentially of recurring units of the formula (A) 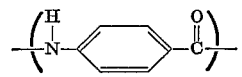

and (AA) 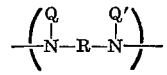

and

BB 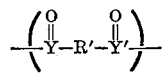

wherein R and R′, may represent the same or different divalent organic radicals; in addition, R may represent a single bond; Q and Q′ are selected from the group of a hydrogen atom and methyl and phenyl radicals; Y and Y′ are selected from the group of

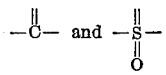

the A units constitute at least about 80 mole percent of the copolymer and the AA and BB units in substantially equimolar amounts constituting up to about 10 mole percent each. The copolyamides may be derived from a major portion of a Formula II salt copolymerized with a minor portion of stoichiometrically equivalent amounts of the appropriate AA and BB intermediates. As suitable AA intermediates there may be mentioned aromatic diamines and tetraamines such as p-phenylenediamine; m-phenylenediamine, benzidine, 4,4′-diaminodiphenylmethane, 4,4′-diaminodiphenylketone, 4,4′-diaminodiphenylsulfide, 4,4′-diaminodiphenylsulfone, 4,4′-diaminodiphenylether, 4,4′-diaminodiphenyl-1,2-ethane, 4,4′-diaminodiphenyl-2,2-propane, 4-methyl-m-phenylenediamine, 2,6-dichloro-p-phenylenediamine, 3,3′-dichlorobenzidine, 4-(4′-aminobenzamido)-aniline, 3,3′-diaminobenzidine, 1,2,4,5-tetraminobenzene, and 3,3′-dihydroxybenzidine; dihydrazides such as oxalyl, isophthaloyl, terephthaloyl, bibenzoyl, adipic, carbonyl, 2,5-pyridinedicarboxylic dihydrazide and hydrazines such as hydrazine, methylhydrazine, phenylhydrazine, N,N′-diaminopiperazine, N,N′-diamino-trans-2,5-dimethylpiperazine, N,N′-diamino-4,4′-dipiperidyl hydrazine. As suitable BB intermediates there may be mentioned diacid halides and disulfonyl chlorides such as adipyl chloride, sebacyl chloride, cyclohexane-1,4-dicarbonyl chloride, 1,4-phenylenediacetyl chloride, cyclobutane-1,3-dicarbonyl chloride, terephthaloyl chloride, terephthaloyl bromide, isophthaloyl chloride, 2,5-dichloroterephthaloyl chloride, 5-chloroisophthaloyl chloride, 5-tertiarylbutylisophthaloyl chloride, bibenzoyl chloride, diphenic acid chloride, sulfonyl dibenzoyl chloride, 2,6-naphthalenedicarbonyl chloride, 1,4 - naphthalenedicarbonyl chloride, 2,6-pyridinedicarbonyl chloride, m-benzenedisulfonyl chloride, p-benzenedisulfonyl chloride, 1,5-naphthalenedisulfonyl chloride, 4,4′ - biphenyldisulfonyl chloride, oxy bis(4-benzenesulfonyl chloride), methylene bis(4-benzenesulfonyl chloride), N,N'-carbonyldisulfanilyl chloride, 4,5-dichloro-1,3-benzenedisulfonyl chloride, 1,6-hexanedisulfonyl chloride, 4-chlorocarbonylbenzenesulfonyl chloride; bisanhydrides such as pyromellitic dianhydride, cyclobutanetetracarboxylic acid dianhydride, naphthalene-1,4,5,8-tetracarboxylic dianhydride, methylene bis(4-phthalic anhydride); and isocyanates such as hexamethylene diisocyanate, 1,4-phenylene diisocyanate, 1,3-phenylene diisocyanate, 4-methyl-1,3-phenylene diisocyanate, 4,4'-biphenylene diisocyanate, bis(4-isocyanatophenyl)methane, bis(4-isocyanatophenyl) sulfone, 3,3'-dimethyl-4,4'-biphenylene diisocyanate, 3,3'-dichloro-4,4'-biphenylene diisocyanate, 1,4-cyclohexylene diisocyanate, 1,2-bis(4 - isocyanatophenyl)ethane, 4-isocyanatobenzoyl chloride, 4-isocyanatobenzenesulfonyl chloride.

Polymerization conditions

The low temperature, i.e., under 60° C. and preferably from 0°–20° C., solution polymerizations which provide the polyamides useful in this invention preferably employ a solvent selected from the group consisting of TMU, hexamethylphosphoramide, N,N-dimethylacetamide, and N-methylpyrrolidone. Other useful polymerization media are N-methylpiperidone, N,N-dimethyl ethylene urea, N,N,N',N' - tetramethylmalonamide, N - methylcaprolactam, N-acetylpyrrolidine, N,N-diethylacetamide, N-ethylpyrrolidone, N,N-dimethylpropionamide, N,N-dimethylbutyramide and N,N-dimethylisobutyramide.

Choice of a particular polymerization medium for copolymer preparation may depend in part on the particular AA–BB combination contemplated. In general, if the homopolymeric poly(p-benzamide) and the polymer from the AA–BB reactants can be made separately in the particular system, then a useful degree of copolymerization can also be achieved.

The above-mentioned polymerizations may be carried out by dissolving the desired monomer or comonomers in the amide solvent and vigorously stirring the resulting solution, externally cooled, until it becomes very viscous. The polyamide may then be isolated by the addition of water. Alternatively, the monomer or comonomers may first be slurried in a small quantity of an inert organic liquid prior to the addition of the amide solvent. In a variation of the former method, the solvent may be frozen and mixed, while frozen, with the desired monomer or comonomers. The solvent is permitted to thaw and the resulting slush stirred until a gel-like mass forms. A suitable chain-terminating agent may be used in these reactions in order to limit the molecular weight of the polymeric product. For the attainment of the highest molecular weights, these polymerizations are performed under strictly anhydrous conditions. The reaction vessel and auxiliary equipment, solvents, and reactants are carefully dried prior to use and the reaction vessel is continuously swept with a stream of dry, inert gas, e.g., nitrogen, during the polymerization.

One such polymerization may be accomplished by first adding, with stirring, a quantity of an anhydrous organic liquid, such as tetrahydrofuran, dioxane, benzene, or acetonitrile, to a quantity of the desired monomer in the gas-swept polymerization apparatus. This liquid also contains the calculated amount of the desired chain-terminating agent, e.g., benzoyl chloride, whenever this agent is to be used. The resulting mixture is stirred at an increased rate and a relatively large volume of anhydrous amide solvent, e.g., TMU, N,N-dimethylacetamide, hexamethylphosphoramide, or N-methylpyrrolidone, is then rapidly added to the flask. The resulting solution, externally cooled, is stirred continuously until there is a substantial increase in the viscosity of the composition. The latter may, if desired, stand overnight or longer at room temperature. When the polymer is to be isolated in bulk form, the polymerization mixture is combined with water in a suitable blender and then is converted to a fine powder.

The powdered polymer, after being washed with both water and alcohol, is dried overnight in a vacuum oven at about 80°–90° C. before being stored or dissolved for subsequent processing.

As indicated above, chain terminators may be used in these polymerizations. By assisting in the control of the molecular weight of the polyamide, the use of chain terminators contributes to the ease by which subsequent dissolution of the polymer occurs and enhances the stability of the polymer dope for application in the coupled polymerization spinning process. Among the suitable chain terminators are monofunctional compounds which can react with the acid chloride ends of these polyamides such as ammonia, monoamines (e.g., methylamine, dimethylamine, ethylamine, butylamine, dibutylamine, cyclohexylamine, aniline, etc.), compounds containing a single amide-forming group, such as N,N-diethylethylenediamine, hydroxylic compounds such as methyl alcohol, ethyl alcohol, isopropyl alcohol, phenol, water, etc., and monofunctional compounds which can react with the amine ends of the polyamides such as other acid chlorides (e.g., acetyl chloride), acid anhydrides (e.g., acetic anhydride, phthalic anhydride, etc.), and isocyanates (e.g., phenyl isocyanate, m-tolyl isocyanate, ethyl isocyanate, etc.).

Useful difunctional terminators include members of the groups hereinbefore designated as AA and BB intermediates. These may additionally serve as chain terminators when employed in slight excess in copolymer preparations utilizing AA and BB coreactants or a minor amount of the appropriate difunctional compound may be added to the reaction mixture during preparation of the Formula I homopolymer or during preparation of a copolymer comprising units previously designated herein as A and B units. Useful difunctional terminators include terephthaloyl chloride, isophthaloyl chloride, sebacyl chloride, 4,4'-biphenyldisulfonyl chloride, pyromellitic dianhydride, p-phenylenediisocyanate, benzidine diisocyanate, bis(4-isocyanatophenyl) methane, p-phenylenediamine, m-phenylenediamine, benzidine, bis(4-aminophenyl) ether, N,N'-diaminopiperazine, adipic dihydrazide, terephthalic dihydrazide and isophthalic dihydrazide. All terminators both mono- and di-functional, are especially effective and uniformly distributed if added at the beginning of the polymerization or prior to the addition of any acid-neutralizing agent (e.g., lithium hydroxide).

The essentially homopolymeric poly(p-benzamide) of the invention possesses a peak height ratio of below 0.86 and, moreover, no sediment is seen in the tube when the polymer is subjected to the sedimentation test, all as described below. It has been found that polymer of inherent viscosity >0.80 and meeting these two requirements can be spun into yarns having an extremely high modulus and a low orientation angle. It will be understood, however, that the peak height ratio as measured on polymer that has been spun or heated at elevated temperatures may exceed 0.86. Sedimentation properties may also change on heating or spinning.

The copolyamides of the invention having an inherent viscosity >0.5 are suitable for fiber formation.

Dope preparation

The polyamides which have been prepared by the previously described methods and which have been isolated from the polymer preparation system are then incorporated into dopes for spinning, etc. One such method is as follows: a mixture of homopolyamide, TMU, and lithium chloride in proportions earlier defined is placed in a suitable vessel equipped for stirring. In this method the homopolyamide may be replaced by the copolyamide where solubility permits (as determined by sedimentation test). If the copolyamide is insoluble in this medium, other solvents are employed. The mixture is stirred and heated at about 130°–150° C. for at least 1 hr. While the stirred mixture is maintained at this temperature, it generally becomes an extremely viscous, gelatinous mass completely unsuitable for spinning. This material is then cooled to about 0° C. or below in a bath of solid carbon dioxide, or by other cooling means, for about an hour. This thermal cycle may have to be repeated as many as four or more times to obtain a spinnable dope.

The amount of heating and cooling required to form by this method a dope with the flow characteristics needed for smooth spinning varies with the inherent viscosity, the crystallinity, and the particle size of the polyamide sample employed, as well as with the quality of the stirring action. In the formation of these dopes care must be taken to avoid overheating the dope locally and thus forming a "dry" or gelled spot. Such portions of polymer do not readily redissolve.

When the low-temperature-solution polymerization is conducted in TMU with p-aminobenzoyl chloride hydrochloride as the monomer, the polymer formed usually attains a useful molecular weight after the polymerization has proceeded for about 15 minutes to an hour or even longer and the mixture is useful as a dope that can be spun or cast. Gelling may begin to occur in from about 0.5 to 2 hours reaction time, depending in part at least upon the degree of polymerization attained. The stability of such dopes may be extended to periods of many days by the addition of chain-terminating agents described earlier. A directly extrudable dope may be obtained where polymerization is continued in TMU for a time in excess of about 0.5 hour or more by adding a quantity of lithium chloride to the TMU medium prior to the polymerization or by adding to the half hour-old reaction system a quantity (up to 2 equivalents of lithium per mole of monomer charged when an acid chloride hydrochloride is employed) of an inorganic salt or salt-forming reagent such as lithium chloride, lithium acetate, lithium hydroxide, lithium carbonate, or lithium oxide; in addition, external heat may be subsequently applied to the contents of the reaction vessel to assist in forming or maintaining the extrudable dope. The above-cited basic materials each react with the hydrogen chloride formed during the polymerization to generate lithium chloride in situ. It is preferred that lithium hydroxide, lithium oxide and like bases be used in amounts not in excess of that required to neutralize the hydrogen chloride or other acids formed in the reaction. In spinning these TMU dopes described above, spinnerets of platinum-gold construction and reservoirs, filters, conduits, and the like, prepared from, for example, corrosion-resistant stainless steel, are particularly suitable. Metals coated with "Teflon" polyfluorocarbon and glass-lined equipment, as well as acid-, heat- and solvent-resistant plastic parts may be used.

Shaped articles and their preparation

The previously described dopes (prepared stepwise or coupled) can readily be utilized for the preparation of films, filaments, fibrids and coatings. Tough, clear, flexible films of these polyamides can be wet-extruded by conventional methods. The dopes can be used as liquid coating compositions which are applied to a variety of substrates which may be in the form of sheets, paper, wires, screening, fibers, fabrics, foams, solid or microporous objects, etc. These substrates may be glass, ceramics, brick, concrete, metal (e.g., copper, steel, aluminum, brass), polymeric materials (e.g., wood and other cellulosic materials, wool, polyamides, polyesters, polyacrylonitrile, polyolefins, polyvinyl halides, cured epoxy resins, cured aldehyde-urea resins, etc.).

Conventional wet- and dry-spinning techniques and equipment can be used to prepare the polyamide filaments. In wet spinning, an appropriately prepared TMU (or other suitable solvent) dope of the polyamide, whose temperature may vary from room temperature to about 150° C., is extruded into a suitable coagulating bath, e.g., a water bath maintained at 65°–90° C. Other useful coagulants include ethylene glycol, glycerol, mixtures of TMU and water, mixtures of alcohol and water, and aqueous salt baths. These are preferably maintained at a temperature of 40°–45° C. or above. Formation of good fibers (i.e., those with enhanced tensile properties) is assisted by keeping the filaments taut while they are in the coagulating bath. This may be accomplished, for example, by passing the filaments around guides placed in the coagulating bath.

Dry spinning may be accomplished by extruding filaments from a polyamide-TMU-LiCl dope, preferably maintained at 50°–150° C., into a heated column whereby the TMU is evaporated. With some copolyamides, other solvent media are required.

After being formed, the filaments of this invention are passed over a finish-application roll and wound up on bobbins at high speeds. They can be readily back-wound. Development of maximum levels of filament and yarn properties is assisted by soaking the bobbins in water or in mixtures of water and water-miscible inert organic liquids (e.g., TMU, DMAc, acetone, ethyl alcohol, glycerol) to remove residual solvent and salt. The removal of salt and any residual solvent may also be accomplished by passing the yarn through aqueous baths on the run, by flushing the bobbins with water as the yarn is formed, and by washing or soaking skeins, rather than bobbins, of yarn. The yarn is strengthened by washing with even a minor amount of water.

The fibers of the invention possess high tenacity and a very high initial modulus, i.e., above 200 g.p.d. and often exceeding 300 g.p.d., which is necessary for many reinforced plastic applications. They are crystalline and possess an orientation angle of less than about 35°. In general, as shown in the examples which follow, homopolymeric poly(p-benzamide) and certain copolyamide filaments prepared and treated as described above, possess these unusual and unanticipated tensile properties without being drawn. The freshly extruded filaments are usually of low void content. Use of spin stretch factors (defined below) approaching one in dry spinning or, on occasion, in wet spinning with such polymers will yield as-spun fibers having an orientation angle of above 35° and a modulus below 200. In that event, the fiber may be heated taut at about 400° C. for about 2–5 seconds in nitrogen to bring the orientation angle down and the modulus up.

Heat treatments of the as-spun filaments under tension or with only a slight amount of drawing produce a significant increase in their tenacity and modulus values. Heating is generally carried out above 350° C. The tensile properties of these filaments can also be enhanced by subjecting the undrawn fibers to a heat treatment in the relaxed state. Hot air ovens, hot pins, hot slots, hot plates and liquid heating baths are useful for such treatments.

Certain of the copolyamide fibers develop desirable properties such as high modulus, tensile, etc. only upon being drawn. In such cases conventional drawing procedures may be employed to advantage. The aforementioned heat treatments render the fibers particularly suitable for reinforced laminates in which they may comprise up to 75% by weight, the remainder comprising a synthetic polymer matrix.

The chemical and thermal stabilities of filaments and yarns prepared from poly(p-benzamide) by the processes of this invention are excellent. The fibers retain their tensile properties after being heated at the boil for 0.5 hr. in aqueous hydrochloric acid (1%) and caustic (1%) solutions. The fibers are essentially unaffected after being soaked for one hour at 60° C. in commercially-used dry cleaning solvents such as "Perclene" perchlorethylene and "Triclene" trichlorethylene. The fibers display excellent retention of tensile properties during and after heating in air at 300° C. for a prolonged period. The fibers are self-extinguishing when removed from an open flame.

The polyamide filaments of this invention exhibit only a very slight amount of growth, even at elevated temperatures.

Crystalline and highly oriented fibrids of the polyamides can be prepared from the above described dopes by use of the shear-precipitation procedures described in Morgan U.S. 2,999,788. These fibrids can be pressed into papers.

It will be understood that the usual additives such as dyes, fillers, UV stabilizers, antioxidants, etc. can be incorporated in with the polymer for the purposes intended prior to fiber preparation.

Measurements and tests

*Orientation angle.*—The orientation angle of the fiber is determined by the general method described in Krimm and Tobolsky, Textile Research Journal, vol. 21, pp. 805–22 (1951). A wide angle X-ray diffraction pattern (transmission pattern) of the fiber is made, using nickel-filtered Cu radiation, a fiber-sample thickness of 20 mils (0.05 cm.), a sample-to-film distance of 5 cm., and an exposure time of 45 minutes. The arc length in degrees at the half-maximum intensity of the first equatorial diffraction spot, which is located at 20.3°, $2\theta$, is measured and taken as the orientation angle of the sample. Since the intensity trace is an essentially Gaussian curve and the measurement is made at half-maximum intensity, the physical meaning of the orientation angle given by the determination is that approximately 77% of the crystallites are aligned within this angle about the fiber axis.

*Peak height ratio.*—A measure of the relative intensity of the two major equatorial diffraction peaks is given by the peak height ratio (PHR). A suitable method for determining the PHR involves the use of a reflection technique to record the intensity trace of the X-ray diffraction pattern with an X-ray diffractometer. Approximately 0.5 gram of water- and TMU-free polymer is pressed into a Philips sample holder under an applied pressure of 3,125 lb./in.$^2$ (219.7×10$^3$ g./cm.$^2$). Using nickel-filtered Cu radiation, a Philips diffractometer with 0.5° slits, and a pulse height analyzer, a trace of the intensity is recorded from 6° to 40°, $2\theta$, at a scanning speed of 1°, $2\theta$, per minute, a chart speed of 1 inch per minute (2.54 cm./min.), and a time constant of 2; $2\theta$ being the angle between the undiffracted beam and the diffracted beam. The full scale deflection of the recorder is set so that the peak with maximum intensity is at least 50% of the scale, which is a linear scale. To calculate the PHR, a base line is first established on the diffractometer scan by drawing a straight line between the points on the curve at 8° and 38°, $2\theta$. Vertical lines (at constant $2\theta$ values) are drawn from the peaks in the vicinity of 20.3° and 23.4°, $2\theta$, to the base line, and the height of the peaks, in chart divisions, above the base line is ascertained. The PHR is then calculated from the equation $$PHR = \frac{A}{B}$$

where A=height of the peak, approximately located at 20.3°, $2\theta$, above the base line chart divisions, B=height of the peak, approximately located at 23.4°, $2\theta$, above the base line in chart divisions.

A typical trace appears in the figure. A smooth line was drawn as indicated to compensate for instrument noise and the measurements are made therefrom.

Sedimentation test

Polymer powder (0.10 g.), as prepared, is dried, comminuted to pass through a 20-mesh screen, and placed in a dry test tube. To this are added 10.0 ml. of a solution of lithium chloride (6.9% by weight) in tetramethylurea. The tube is stoppered and its contents subjected to mechanical agitation (the tube is rotated at 110 r.p.m. about a diametrical axis through its mid-point for 24 hours at 21° C.). The tube is then allowed to stand upright for a further 24 hours. After this time no polymer residue lies settled on the bottom of the tube.

*Spin stretch factor.*—

$$S.S.F. = \frac{\text{Velocity of yarn at wind-up (ft./min.)}}{\text{Velocity of dope through spinneret (ft./min.)}}$$

where

Vel. of dope through spinneret $$= \frac{\text{Rate of pumping (cu. ft./min.)}}{\text{No. of spinneret holes} \times \text{cross-sectional area of one hole (sq. ft.)}}$$

*Inherent viscosity.*—Inherent viscosity ($\eta_{inh}$) is defined by the following equation:

$$\eta_{inh} = \frac{\ln(\eta_{rel})}{C}$$

wherein ($\eta_{rel}$) represents the relative viscosity and (C) represents a concentration of 0.5 gram of the polymer in 100 ml. of solution. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C., using concentrated (95–98%) sulfuric acid as a solvent.

Fiber properties of tenacity, elongation, and initial modulus are coded as T/E/Mi and are reported in their conventional units. Denier is coded as den. The boiling off treatment of fibers prior to physical testing consists of boiling the fibers 30 minutes in 0.1% aqueous sodium lauryl sulfate, rinsing, drying at 40° C. for 1 hr., and conditioning at 21° C. and 65%, R.H. for 16 hrs.

Tensile properties were determined on yarn samples which measured one inch (2.54 cm.) in length between the jaws of an Instron tester (product of the Instron Engineering Corp., Canton, Mass.) and which were subjected therein to a load sufficient to cause elongation to occur at the rate of 10% per minute measured at 21° C. and 65% R.H.

The following nonlimiting examples are illustrative of the practice of the invention.

EXAMPLE I

Polymer preparation

A two-liter resin-making kettle equipped with a stirrer, nitrogen-inlet tube and calcium chloride drying tube is flamed with a Bunsen burner and simultaneously flushed with nitrogen. The kettle is sealed and placed in a dry-box, i.e., a chamber maintained under anhydrous conditions. Hexamethylphosphoramide (520 ml., distilled from calcium hydride through a spinning band column at reduced pressure and stored over calcium hydride( is filtered in the dry-box into a Erlenmeyer flask which is then sealed and cooled in ice. Tetrahydrofuran (75 ml., distilled and stored over sodium metal, water content less than 0.0001%) is filtered in the dry-box into an Erlenmeyer flask which is then sealed and cooled in ice. p-Aminobenzoyl chloride hydrochloride (124.0 g. 0.646 mole) is weighed out in the dry-box and transferred to the "resin-kettle." The kettle is removed from the dry-box, reconnected with the stirring motor and nitrogen line, and cooled in an ice bath. Just prior to the polymerization, 1.20 ml. of benzoyl chloride (distilled) is added to the above-mentioned tetrahydrofuran.

The benzoyl chloride-tetrahydrofuran solution is poured, with moderate stirring, into the p-aminobenzoyl chloride hydrochloride and the mixture is stirred for about one minute. The stirring rate is increased and the hexamethylphosphoramide is rapidly added. The resulting mixture is stirred for about one hour while being cooled in an ice bath. The mixture gradually gels as a result of this treatment. The cooling bath is removed and the polymeric mass is allowed to stand overnight at room temperature. The solid gel is then combined with water and stirred at high speeds in a gallon-size (3.785 liter) blender wherein it is converted to a fine, white powder. The polymer is washed three times with water and once with alcohol by means of stirring in a blender and filtration on a sintered-glass medium-pore Buchner funnel. The polymer is dried overight in a vacuum oven at 80°–90° C. The yield of poly(p-benzamide) is 92.3% ($\eta_{inh}=1.35$). The polymer had a peak height ratio of 0.78. When subjected to the sedimentation test, no solid residue remained at the bottom of the tube.

Dope preparation

Into a 700 ml. bottle equipped with an air-driven stirrer are placed 20 g. of the polymer and 180 g. of TMU/lithium chloride solution containing 6.5% by weight of the salt. The resulting mixture is stirred and heated to 150° C. by means of an oil bath. There is obtained an extremely viscous gelatinous mass. This mixture is cooled in solid carbon dioxide for one hour. The mixture is then heated at 150° C. for 4 hours, with stirring, to produce a fluid, somewhat gelatinous hazy dope. The latter is cooled for one hour in solid carbon dioxide. The mixture is then stirred and heated for 4 hours at a temperature of 130° C. to produce a readily-spinnable hazy dope which is subsequently cooled in solid carbon dioxide for one hour. This smooth, hazy dope flows slowly at room temperature and reflects light upon being stirred.

Fiber preparation by dry spinning

The dope prepared as above is heated to 130° C. and extruded at the rate of about 0.9 ml./min., under a pressure of 70 lb./in.$^2$ (4,921 g./cm.$^2$), through a heated (140°–144° C.) protrusion-type spinneret having 4 holes of 0.004 inch (0.01 cm.) diameter and a capillary length of 0.008 in. (0.02 cm.), into a drying column whose walls are kept within the range of 202°–210° C. The column is swept with a cocurrent flow (5 ft.$^3$/min.; 0.142 m.$^3$/min.) of dry nitrogen which enters the column at 265°–270° C. The emerging filaments, each of approximately 2 denier and having an oval cross-section, are passed over a small guide roll bearing a finish solution and are wound up on a bobbin at the rate of about 200 yd./min. (183 m./min.). This constitutes a spin stretch factor of 6.58. The filaments do not stick and are readily back-wound. These opaque extruded filaments become lustrous white upon being soaked in changes of water (25° C.) to remove residual solvent and salt. The inherent viscosity of the polymer in the filaments is 1.32. The water-leached, air-dried (70° F. 65% R.H.) filaments exhibit crystallinity and an orientation angle of 21°. A yarn prepared from these filaments exhibits the following T/E/Mi/den. values (32 filaments; non-boiled-off): 6.02/2.17/431/58.5. Filaments that have been boiled off display the following T/E/Mi/den. values: 4.75/1.38/429/1.72.

Heat treatment of fibers

The filaments or yarn prepared as above are passed taut over a 3 inch (7.62 cm.) plate maintained at 438° C. in a single stage operation so as to increase their length by 0–1%. Residence time over the hot plate was about 5 seconds. The resulting fibers exhibit crystallinity and have an orientation angle of 13°. Filaments have the following T/E/Mi/den. properties (boiled off fiber): 7.66/1.2/599/1.87.

Other filaments prepared as above were subjected to heat treatments in both the relaxed and taut states. It was noted that the tensile properties of the filaments were improved.

The following Table I summarized improvements obtained in the tensile properties of water-leached, air-dried undrawn poly(p-benzamide) fibers prepared similarly but not exactly as above. The fibers are given the indicated heat treatments in both the relaxed and taut states for a one hour period. Contrasting data is shown for a control sample. All values shown are for boiled off filaments and are obtained after the filaments are returned to room conditions (70° F., 65% R.H.).

TABLE I

| Sample | Treatment conditions | Post-treatment tensile properties observed | | | | | |
|---|---|---|---|---|---|---|---|
| | | Relaxed fiber | | | Taut fiber | | |
| | | T | E | Mi | T | E | Mi |
| A | 200° C. hot air oven | 6.88 | 1.75 | 476 | 7.34 | 1.92 | 473 |
| B | 250° C. hot air oven | 7.38 | 1.67 | 491 | 7.45 | 1.72 | 456 |
| C | 198°–210° C. glycerol bath | 6.79 | 1.79 | 457 | 6.17 | 1.62 | 443 |
| D | 235°–268° C. "Silicone-550"* oil bath | 6.61 | 1.48 | 506 | 7.50 | 1.74 | 503 |
| E | Control | T/E/Mi: | | | 5.85/1.69/426 | | |

* Designation for a fluid, heat-stable silcione product of the Dow-Corning Corporation.

EXAMPLE II

This example illustrates the preparation of the poly-(p-benzamide) fibers of the invention wherein a coupled process of polymer production and filament spinning is employed. It will be noted that the fiber properties are significantly enhanced after heat treatment.

In a 250 ml. round bottom flask (dried by flaming, filled with dry nitrogen, equipped with a stirrer, drying tube, and nitrogen inlet, and immersed in an ice-water bath) are combined 11.5 g. of p-aminobenzoyl chloride hydrochloride and 61 ml. of cold TMU. Immediate solution results. The mixture is stirred for 2 hrs. at approximatley 0° C. and for 16 hrs. at 26° C. During this time the polymer separates as a swollen precipitate. Lithium hydroxide (2.87 g.) is added as an anhydrous powder and stirred in. There is considerable heat of neutralization and shortly thereafter a nearly clear, viscous dope of polymer containing now LiCl results, which at 100–120° C., has the required consistency for facile dry-spinning. (The inherent viscosity of an isolated polymer sample is 1.12. It was a peak height ratio of 0.73 and passes the sedimentation test.)

The above-described dope is dry-spun under the following conditions: spinneret adapter temperature, 120° C.; pressure on dope 100 p.s.i. (7,031 g./cm.$^2$); spinneret, 3 holes of 0.004 inch (0.01 cm.) diameter, each; spinneret temperature, 135–140° C.; column-wall temperature, 195–203° C.; wind-up speed, 200 yd./min. (183 m./min.). The spin stretch factor was 6.13. The yarn on bobbins is soaked in repeated changes of water at room temperature until essentially free of TMU and lithium chloride.

The T/E/Mi/den. values of the washed and boiled-off fiber are 7.16/2.16/486/2.80, respectively. The fibers are crystalline and have an orientation angle of 16°.

After passing the washed, dry fiber over a hot plate at 438° C., the T/E/Mi/den. values for a boiled-off sample of filaments are 10.7/1.7/695/2.82, respectively. The filaments are highly crystalline and exhibit an orientation angle of 12°.

EXAMPLE III

This example illustrates the preparation of poly(p-benzamide) fibrids of the invention and of a fibrous sheet therefrom. Fibrids are described in the aforementioned Morgan patent.

About 20 ml. of a 10% dope of poly(p-benzamide), (peak height ratio .80, $\eta_{inh}=1.51$) in TMU-LiCl (6.5%) and obtained by the general process of Example I, is prepared in a manner analogous to Example I by repeated heating of the polymer-solvent mixture to 130–140° C. and alternate cooling with solid carbon dioxide. This dope, at room temperature, is poured slowly into 300 ml. of water (at about 30° C.) in a one-quart (0.946 l.) blender with the shearing blades running at full speed. The fine, fibrous particles are collected and washed on a fritted glass funnel and form thereon, upon drying, a strong cohesive sheet. The sheet is placed between two aluminum foils in a press with the platens heated at 200° C. and subjected to a pressure of 10,000 p.s.i. (703.1 kg./cm.$^2$) for 2 minutes. A smooth, tough sheet is obtained. The fibrous particles (fibrids) show, upon X-ray examination, high crystallinity and a high degree of orientation. The fibrid orientation angle determined by electron diffraction is 18°.

EXAMPLE IV

The preparation of a film of copoly(1,4-benzamide/3-methyl-1,4-benzamide) (90/10, mole basis) is demonstrated in this example.

In a dry 250 ml. round-bottom flask equipped with stirrer, drying tube, and nitrogen inlet are placed 0.618 g. (0.003 mole) of 4-amino-3-methylbenzoyl chloride hydrochloride and 5.185 g. (0.027 mole) of 4-aminobenzoyl chloride hydrochloride are added. The mixture is stirred and cooled with an ice bath while 3.5 ml. of cold tetrahydrofuran are added. This is followed by the addition of 25 ml. of cold hexamethylphosphoramide in a single portion. The mixture is further stirred at 0° C. for 1 hr. and allowed to stand 16 hrs. at about 25° C. The polymer precipitates from the reaction mixture. The mass is stirred vigorously in water in a blender, then washed thoroughly with water and ethanol. The yield of finely powdered, white polymer is 97% and the inherent viscosity is 1.06.

A film is prepared from a composition containing 0.5 part of the copolyamide, 0.32 part of lithium chloride, and 4.18 parts of TMU by spreading the same on a glass plate by means of a "doctor knife" having a clearance of 0.01 inch (0.254 mm.). The coated plate is immersed in water, removed, and the resulting film thoroughly washed with water before being pressed between paper towels at 100° C. at 625 p.s.i. (43.9 kg./cm.²) for 6 minutes. The film is self-supporting, translucent and tough.

EXAMPLE V

Into a 2-liter resin kettle are placed 153.6 g. (0.8 mole) of p-aminobenzoyl chloride hydrochloride with stirring under nitrogen. A 2% solution of lithium chloride in distilled TMU is prepared, heated at 60° C. and topped under vacuum to remove any water which might be present. About 800 g. of this solution are added rapidly to the monomer powder in the resin kettle at 30° C. while stirring. After about three-fourths of an hour, the first of three 4 ml. additions of diethylamine is made to stop the polymerization. The second 4 ml. are added 5 minutes later and the final 4 ml. are added 30 minutes after that. About 70 g. (0.946 mole) of lithium carbonate are added 18 min. later. The resulting viscous mix is then heated in an oil bath at 115–120° C., diluted with 150 ml. of TMU and stirred under vacuum to distill off water formed in the neutralization and excess solvent. Final polymer concentration is about 9%.

One portion of the mix is diluted in dimethylformamide/lithium chloride 95/5 and coagulated in water. The precipitated polymer is washed in distilled water three times and finally in acetone. It was then dried at 60° C. under vacuum. It has an inherent viscosity of 0.97, a peak height ratio of 0.80, and when subjected to the sedimentation test, leaves no solid polymer residue at the bottom of the tube.

Fiber preparation by wet spinning

The 9% dope as prepared above is pre-filtered through a 200 mesh stainless steel screen to remove excess Li$_2$CO$_3$ powder. Approximately 300 g. of the dope are then placed in a spinning cell, then filtered through a sand and screen filter pack before reaching the spinneret. The spinneret has 100 holes, each having a diameter of 0.003 inch (0.076 mm.). They are arranged in three circles within a half-inch (1.27 cm.) diameter overall. The spinneret jets into a 65° C. bath of distilled water which is continuously recirculated and filtered. The bath is also continuously diluted with fresh water to prevent excessive build-up of salt and solvent in the bath. The yarn is drawn through a 135 cm. bath and over a 3.75 inch (9.53 cm.) diameter bobbin and wound up on a second 3.75 inch (9.53 cm.) bobbin. The spin stretch is controlled by varying the wind-up speed of the first bobbin. The minimum wind-up speed possible without yarn build-up in the bath is 32 ft./min. or 384 in./min. (16.26 cm./sec.). The calculated unextracted polymer solution jet velocity is 605 in./min. (25.61 cm./sec.). This indicates a lengthwise extraction shrinkage of 36.5% before wind-up. The optimum wind-up speed is found to be 540 in./min. (22.86 cm./sec.) and the maximum wind-up speed at which continuous spinning was possible was 635 in./min. (26.88 cm./sec.). These values correspond to spin stretch values of 1.4 and 1.65, respectively, based on the normalized value of 384 in./min. (16.26 cm./sec.) at spin stretch of 1.0. Based on jet velocity they are 0.893 and 1.05, respectively.

The as-spun yarn is soaked for 2 hours in water, then allowed to dry on the bobbins. The as-spun yarn has an orientation angle of 27° as determined by X-ray analysis. T/E/Mi/den. values for the as-spun yarn are 5.9/4.8/354/3.1 (after boil-off).

The yarn is subsequently heat treated by drawing it over a 12 inch (.30 m.) long grooved hot shoe at 30 ft./min. (15.24 cm./sec.) to give a 2-second contact time. A nitrogen blanket is maintained over the hot zone.

The wet-spun sample after various heat treatments has the following properties (boiled-off):

| Temp., °C. | T/E/Mi (g.p.d./percent/ g.p.d. | D.p.f. | Orientation (23.4°) degree |
|---|---|---|---|
| 400 | 7.0/1.7/596 | 2.9 | 16 |
| 450 | 8.9/1.4/773 | 2.9 | 15 |
| 500 | 8.4/1.0/990 | 2.9 | 14 |
| 550 | 6.9/0.8/937 | 2.8 | 12 |

EXAMPLE VI

This example illustrates the effect of heat treatment on the tenacity and modulus of fibers of the invention and preparation of a laminate from such fiber.

A 2-liter resin-making kettle is dried by flaming and allowed to cool in a nitrogen atmosphere. The kettle is fitted with an egg-beater-type aluminum stirrer and nitrogen inlet and outlet devices. While a slow current of dry nitrogen is passed through the kettle, it is charged with 150 g. of p-aminobenzoyl chloride hydrochloride. To this are added rapidly with vigorous stirring, 770 ml. of TMU, precooled to about −10° C. (This solvent had previously been dried to a water content of less than 150 parts per million by distillation over calcium hydride.) Considerable heat is evolved initially; this is absorbed by surrounding the kettle with an ice-bath for the initial 15 min. after reaction was started. After stirring the kettle's contents for about 2 hrs. at about 21° C., 38.0 g. of powdered, anhydrous lithium hydroxide is added and the stirred mixture is raised to a temperature of 120° C. by external heating. The highly viscous, rubbery mixture becomes a more free-flowing spin dope as stirring at 120° C. is continued for about 30 min. By distilling off about 50 ml. of solvent under a vacuum of about 20 cm. of mercury, most of the water, introduced by reaction of lithium hydroxide, is removed. The spin dope contains 10.2% polymer content.

Approximately 5 g. of spin dope are added to 200 ml. water in a Waring blender. After stirring this for 5 min., the aqueous liquid is decanted from the precipitated polymer. A further 200 ml. water are added and stirring continued for a further 5 min. The treatment is repeated, using 200 ml. ethanol in place of the water. The polymer is filtered and dried for 15 hrs. at 70–80° C. in a vacuum oven (20–40 cm. of mercury) fitted with a nitrogen bleed. The polymer has an inherent viscosity of 1.38, a peak height ratio of 0.76, and, under the conditions of the sedimentation test, leaves no polymeric residue on the bottom of the test tube after 48 hours.

Spinning

The above spin dope is dry spun as follows. From the spinning vessel, in which it was kept at 115° C., the dope is expressed by a piston under a pressure of 68 lb./in.$^2$ (4,780 g./cm.$^2$) through a spinneret adapter (at 125° C.), then through a spinneret (at 160° C.). The spinneret is of the protrusion type, consisting of 9 effective holes, each of 0.004 in. (0.01 cm.) diameter. In the adapter the dope passes through a filter consisting of one 50 mesh screen, three 200 mesh screens, one cotton cloth of 2.4 oz./yd.$^2$ (81.5 g./m.$^2$) woven in a plain weave with 148 pics per inch and 160 ends per inch, and one table felt pad of 2.8 oz./yd.$^2$ (95 g./m.$^2$) and a density of 7.8 lbs./ft.$^3$ (0.125 g./cm.$^3$) at atmospheric pressure. The dope jets through the spinneret at a rate of 292 ml./min. into a co-current stream of nitrogen at a temperature of 235° C., flowing at 5 ft.$^3$/min. (0.142 m.$^3$/min.), in a spinning cell with walls heated at 200° C. The fibers issuing from the cell are passed through water and wound up at a rate of 135 yd./min. (123.5 m./min.), (spin stretch factor is 3.2). The fiber is wound up at this rate for 1 hour. The yarn cake is then immersed in a large excess of distilled water at 21° C. for 15 hrs. to extract salt and solvent. The wet cake is stored in a polyethylene bag. The as-spun and extracted yarn exhibits T/E/Mi/den.=8.22/3.1/ 509/3.06, after being dried.

Extracted and dried yarn of the preceding preparation is passed through a hot stainless steel tube, 0.286" (7.26 mm.) inside diameter and 32" (81.3 cm.) in length, at 12 ft./min. (3.66 m./min.) under a nitrogen atmosphere without significantly changing its length. The nitrogen is passed through the tube from the yarn entry end at such a rate as to change the atmosphere in the tube once every minute. The tube is heated externally by a 12" (0.3 m.) long furnace which was controlled by a thermocouple braised to the external central surface of the pipe and connected to a Minneapolis-Honeywell "Pyrovane" controller. The nominal heat-treating temperature of the tube given in Table III is the temperature indicated by a thermocouple braised to the center of the inside of the tube. A profile of the temperature in the tube for a "nominal" temperature of 536° C. obtained by varying the position of a test thermocouple is given in Table II.

TABLE II

Temperature profile of heat-treating tube

| Distance from entrance:[1] | Temperature, ° C. |
|---|---|
| 0 | 135 |
| 6 | 179 |
| 10 | 336 |
| 12 | 452 |
| 14 | 515 |
| 15 | 532 |
| 16 | 537 |
| 17 | 536 |
| 18 | 527 |
| 20 | 474 |
| 22 | 368 |
| 24 | 270 |
| 28 | 213 |
| 32 | 184 |

[1] In. (multiply by 2.54 for distance in cm.).

Properties of yarns treated at different temperatures are given in Table II.

TABLE III

| Sample | Nominal heat treat. temp., ° C. | Den. Fil. | Ten., g./d. | Elong., percent | Mod., g./d. | Fiber den., g./cm.$^3$ | Fiber inh. vis. | Orient. angle, degrees | Peak height ratio |
|---|---|---|---|---|---|---|---|---|---|
| 1 | ([1]) | 3.060 | 8.22 | 3.1 | 509 | 1.4183 | 1.67 | 18 | .63 |
| 2 | 100 | 3.231 | 8.04 | 2.8 | 486 | 1.4180 | 1.69 | 17 | .65 |
| 3 | 200 | 2.769 | 9.38 | 2.5 | 545 | 1.4270 | 1.74 | 15 | .67 |
| 4 | 304 | 3.033 | 10.25 | 2.4 | 604 | 1.4363 | 1.78 | 13 | .72 |
| 5 | 400 | 2.804 | 13.18 | 2.5 | 671 | 1.4622 | 1.92 | 15 | .71 |
| 6 | 500 | 2.691 | 15.96 | 2.1 | 861 | 1.4643 | 2.32 | 13 | .90 |
| 7 | 525 | 2.649 | 16.87 | 1.9 | 1,040 | 1.4655 | 2.40 | 10 | 1.19 |
| 8 | 536 | 2.785 | 15.69 | 1.7 | 1,029 | 1.4639 | 2.61 | 10 | 1.15 |
| 9 | 550 | 2.885 | 15.48 | 1.6 | 1,030 | 1.4643 | 2.75 | 10 | 1.10 |

[1] Room temperature.

Preparation of a laminate

Yarn from the preceding spin is heat-treated by passing the yarn through a hot tube at a nominal temperature of 536° C. and a speed of 11.58 ft./min. (3.53 m./min.). It is wound up on a bobbin of 4.13 in. (10.5 cm.) diameter as a thin cake approximately 1.5 in. (3.81 cm.) wide. The traversing rate at the wind-up is 1 stroke/11 revolutions; the yarn filaments in the cake are nearly parallel. A test specimen of the yarn has denier/T/E/Mi values of 2.967/16.17/1.7/1096.

A laminate is prepared from the above fiber as follows. A mixture consisting of 10 g. "Epon 815" (Shell's epoxy resin), 9 g. of "Nadic" (methyl anhydride curing agent Allied Chem. Corp.), and 0.1 g. of benzyldimethylamine is poured into a mold having a cavity with the following dimensions: length, 5.95 in.; width, 0.5 in.; depth, 0.9 in. (15.2 cm. x 1.27 cm. x 2.29 cm.). The mold and its contents are placed in a vacuum chamber for 1 hour to remove gases. The mold is then removed from the vacuum chamber. The fiber is cut from the bobbin and divided into ribbons (5.95 in. (15.2 cm.) long) which are arranged in a stack with the fibers substantially parallel to the long axis to the ribbon. The fiber weighs 4.84 g. The fiber is placed on top of the resin and gently pressed in, care being taken to preserve the parallel orientation of the fibers. The mold and its contents are returned to the vacuum chamber for a further 30 minutes for removal of unwanted gases. The mold is then taken from the vacuum chamber and a flanged plug, having dimensions of 5.75 in. x 0.5 in. x 1.0 in. (14.6 cm. x 1.27 cm. x 2.54 cm.), is pushed into the cavity and pressed slowly down upon the resin-fiber mix in order to allow bubbles and excess resin to find their way to the open spaces between the plug ends and cavity ends without disarranging the fibers. The plug flange rests upon shims which are sized to leave a gap of 0.1 in. (0.254 cm.) between the plug and the bottom surface of the mold. The mold and its contents are placed in a Pasadena press, the platens of which have been heated to 150° C. The press is closed and a total pressure of 1.5 tons (1.36 metric tons) is applied to the mold. The mold is left in the press for 2.75 hrs. before being taken out and cooled to room temperature.

The ends of the laminate sample are cut off and hand sanded. The sample measures 5.32 in. x 0.502 in. x 0.095 in. (13.5 cm. x 1.27 cm. x 0.24 cm.), and weighs 5.68 g. giving a density of 1.35 g./cm.³. The tangent modulus of elasticity in flexure (i.e., flex modulus) of the sample is measured having a 4 in. (10.16 cm.) long portion chosen in the middle of the laminate as the test section. The sample is mounted as a supported beam with load applied in the center in an "Instron" testing machine. The load member is deflected at the rate of 0.02 in./min. (0.508 mm./min.) until a load of 20 lb. (9.07 kg.) is applied. The flex modulus is found to be $14.41 \times 10^6$ lb./in.² ($10.13 \times 10^8$ g./cm.²). By comparison, commercial aluminum with a modulus of 10 to $20 \times 10^6$ lb./in.² (70.3 to $140.6 \times 10^7$ g./cm.²) has a density of 2.56 g./cm.³. Laminates of "E" glass have a theoretical modulus limit of $8 \times 10^6$ lb./in.² ($56.2 \times 10^7$ g./cm.²) at a density of 2.22 g./cm.³.

EXAMPLE VII

The general procedure for preparation of the copolymers described below is as follows. All glassware used in the polymerizations is dried 2–24 hrs. at 150°. The reactions are carried out in a resin kettle which is equipped with an air-stirrer, nitrogen inlet and drying tube. The monomers are weighed out in a dry-box and the resin kettle is charged and assembled in the dry-box and is then connected to the stirrer motor and nitrogen line in a hood. Solvents are measured out in the dry-box, then cooled in a salt/ice mixture in a tightly stoppered graduate cylinder or Erlenmeyer flask.

Monomers are cooled in an ice bath with stirring and the cold solvent is added at once. The mixture is stirred with cooling until it sets up to an unstirrable mass; if this does not happen within 1 hr., the cooling bath is removed and stirring at room temperature is continued for 1 hr. Usually the reaction mixture is left standing overnight at room temperature. Polymer is worked up in water, washed in a blender five times with water and once with ethanol and is then dried in a vacuum oven under nitrogen overnight at 80–100°.

Individual polymer preparations are summarized in Table IV below.

TABLE IV

| Run No. | Monomers, g. | Solvent, ml. | Polymer | $\eta$inh ($H_2SO_4$) |
|---|---|---|---|---|
| 1 | 28.5 A  1.5 B | TMU, 150 | X | 1.00 |
| 2 | 28.5 A  1.5 B | DMAc, 150 | X | 1.18 |
| 3 | 28.5 A  1.5 B | DMAc, 150 | X | 0.97 |
| 4 | 54 A  6 B | DMAc, 300 | Y | 0.78 |
| 5 | 27 A  3 B | DMAc, 150 | Y | 2.09 |
| 6 | 17.28 A  2.84 C | DMAc, 100 | Z | 1.00 |

Codes:
 TMU=Tetramethylurea.
 DMAc=Dimethylacetamide.

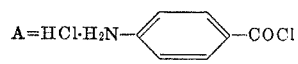

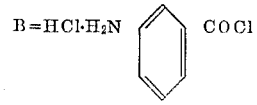

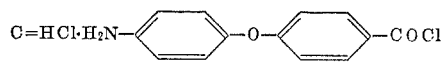

Polymer X is a copolymer having 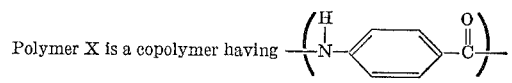

and 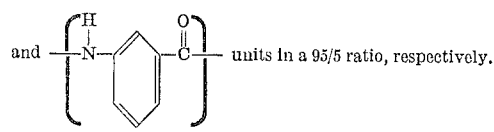 units in a 95/5 ratio, respectively.

Polymer Y is a copolymer having 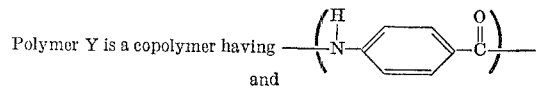 and

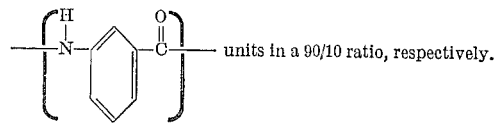 units in a 90/10 ratio, respectively.

Polymer Z is a copolymer having 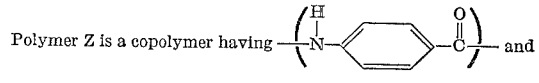 and

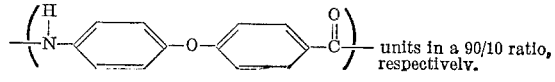 units in a 90/10 ratio, respectively.

Preparation of fiber for dry spinning

A resin kettle equipped with an air-motor driven split disc stirrer is charged with 90 g. of DMAc/LiCl (95/5 by weight). Ten grams of the polymer of Run 2 above is added. The suspension is heated with stirring in a 90° oil bath. A clear gel forms in 5 minutes at 90°. The heat is removed and stirring continued with ice cooling for 1 hr. A viscous dope suitable for spinning forms.

This dope is dry-spun using a five-hole (0.004" diameter, 0.01 cm. diameter) spinneret at the rate of 2.05 ml./min. and a wind-up speed of 150 yd./min. (137 m./min.). The spin stretch factor is 2.7. The yarn is soaked in water overnight and an additional hour in fresh water. The washed yarn is dried on the bobbin for 2 hrs. in a slow current of air at about 50° C. The yarn is then drawn over a heated plate at several temperatures and a draw ratio of 1.05 with the following substantial increases in initial modulus.

TABLE V

| Heating conditions, ° C. | T | E | Mi | Den. | Orientation angle, degree |
|---|---|---|---|---|---|
| None | 3.2 | 4.2 | 192 | 2.5 | 33 |
| 380 | 5.2 | 1.8 | 348 | 2.3 | 12 |
| 425 | 7.4 | 2.1 | 379 | 2.2 | 11 |
| 480 | 11.2 | 1.8 | 680 | 2.3 | 13 |

An 11 g. quantity of the copolymer of Run 6, above, is dissolved in 99 g. DMAc/LiCl (95/5 by weight) by stirring with a split disc stirrer while the materials are heated in an 80° C. oil bath for 20 minutes. A viscous dope results; the viscosity is reduced by cooling the dope to room temperature, after which it is stirred for 30 min. This dope is dry spun at a rate of 2.05 ml./min. through a spinneret having five holes of 0.004 in. (0.01 cm.) diameter, each, with the resulting yarn being washed on the run with water and wound up on a bobbin at 200 yd./min. (183 m./min.) (spin stretch factor=3.6). The yarn is extracted overnight in water, soaked 2 more hours in fresh water, then dried in warm air for 4 hours. The yarn is drawn under conditions indicated in the table below, with pertinent properties as shown.

TABLE VI

| Item | Treatment | T | E | Mi | Den. | Orient. angle, degree |
|---|---|---|---|---|---|---|
| 1 | As spun | 2.5 | 8.7 | 111 | 2.1 | 47 |
| 2 | Heated at 385–390° C | 5.2 | 2.0 | 320 | 1.7 | 14 |
| 3 | Drawn 1.1X at 426° | 7.9 | 2.5 | 385 | 1.6 | 23 |
| 4 | Drawn 1.1X at 480° | 11.1 | 2.6 | 470 | 1.7 | 14 |

A mixture of 8 g. of the copolymer identified in Run 4 Table IV above but having an inherent viscosity of 1.27 and 3.0 g. of the same copolymer but having an inherent viscosity of 0.97 is dissolved in 99 g. DMAc/LiCl (95/5 by weight) by stirring with a split disc type stirrer in an 80–90° C. oil bath for 30 min. and cooling to room temperature. The dope is extremely viscous and is diluted with an additional 12 g. of the solvent. A very viscous clear dope, containing a few gel-like lumps, results after stirring 30 min. at room temperature with occasional cooling in ice water. The final concentration is 9% by weight and this dope is dry spun at 2.34 ml./min. through a five-hole spinneret, each hole of 0.04 inch (0.01 cm.) diameter, and the yarn wound up at 121 yds./min. (111 m./min.). The spin stretch factor is 1.91.

The yarn is extracted with distilled water overnight + 2 hrs. in fresh water. It is dried on the package in warm air for 2 hrs. The yarn is drawn under conditions indicated in the table below with pertinent properties as shown.

TABLE VII

| Item | Drawn at ° C. | T | E | Mi | Den. | Orient. angle, degree |
|---|---|---|---|---|---|---|
| 1 | As spun | 3 | 9.5 | 165 | 2.9 | 47 |
| 2 | 1.24X at 426 | 8.6 | 2.2 | 518 | 2.2 | 12 |
| 3 | 1.1X at 480 | 11.2 | 2.6 | 577 | 2.5 | 14 |

The marked improvement in properties upon heat treatment of the fiber will be noted. The yarn of Item 1 has an as spun modulus of 165 and an orientation angle of 47°. Heat treatment as indicated in Items 2 and 3 raised the modulus and lowered the orientation angle to 12° and 14°, respectively.

EXAMPLE VIII

This example illustrates the preparation of copoly-(1,4-benzamide/3-methyl-1,4-benzamide) (95/5, mole basis) and the preparation of fibers therefrom.

Copolymer preparation: A one-liter resin-making kettle equipped with a stirrer, nitrogen-inlet tube, and calcium chloride drying tube is flushed with nitrogen and flamed. The apparatus is placed in a dry-box and 3-methyl-4-aminobenzoyl chloride hydrochloride (3.71 g., 0.018 mole) and 4-aminobenzoyl chloride hydrochloride (65.68 g., 0.342 mole) are added to the kettle. The apparatus is removed from the dry-box, cooled in ice, and rapid stirring begun. Successively added to the kettle are cooled tetrahydrofuran (54 ml.) and cooled hexamethylphosphoramide (300 ml.). Immediate solution results. This reaction mixture is cooled in an ice bath with stirring. Precipitation begins after 50 minutes. It is stirred while cooled for 10 more minutes. After an additional .75 hour with stirring of the contents at room temperature, complete solidification occurs. After allowing the white reaction mass to stand overnight at room temperature, the polymeric mass is placed in a blender and stirred with water. The resulting white powder is filtered, washed three times with water in a blender (filtered after each wash), washed once with alcohol in a blender, filtered, and dried overnight in a vacuum oven at 90° C. There are obtained 43.02 g. of copolymer, $\eta_{inh}$=1.71.

Dope preparation

Into a 500 ml. resin-making kettle equipped with a shear disc stirrer, condenser, and drying tube are placed 20 g. of the copolyamide and 180 g. of TMU/lithium chloride solution containing 6.54% by weight of the salt. The kettle and its contents are cooled in solid carbon dioxide for 2 hours, then permitted to stand overnight at room temperature. The contents of the vessel are heated for 3 hours at 125° C., cooled in solid carbon dioxide for 2 hours (no stirring), heated and stirred at 125° C. for 2 hours and at 120° C. for 16 hours. An additional 20 g. of the TMU/lithium chloride solution are then added to the kettle, thus reducing the polymer content to 9%. The vessel's contents are cooled in solid carbon dioxide for 2 hours, heated and stirred at 125° C. for 4 hours, cooled in solid carbon dioxide for 2 hours, permitted to stand overnight (about 16 hours) at room temperature, heated and stirred at 125° C. for 4 hours, cooled in solid carbon dioxide for 2 hours, permitted to stand for about 16 hours at room temperature, heated to 138° C. and subjected to dry spinning.

Fiber preparation by dry spinning

The dope as prepared above is extruded under a pressure of 80–100 lb./in.$^2$ (5,625–7,031 g./cm.$^2$) through 7 holes of 0.004 inch (0.01 cm.) diameter of a heated (140°–142° C.) spinneret into a drying column whose walls are within the range of 190°–200° C. The column is swept with a cocurrent flow of nitrogen (4.5 ft.$^3$/min.; 0.127 m.$^3$/min.) which enters the column at about 235° C. A finish solution is applied to the emerging filaments which are wound up on a bobbin at the rate of about 183 yd./min. (167 m./min.). The bobbin is soaked in two changes of distilled water (25° C.) for about 62 hours. These water-leached, air-dried (70° F., 65% R.H.) filaments exhibit crystallinity, an orientation angle of 21°, and the following tensile property values: T/E/Mi/den.: 4.58/1.3/425/2.36.

Heat treatment of fibers

The filaments or yarn prepared as above are passed taut in a single stage operation over a 3 inch (7.62 cm.) plate maintained at 440° C. under a nitrogen atmosphere. Residence time over the plate is about 4 secs. The resulting filaments exhibit high crystallinity, an orientation angle of 12°, and the following tensile property values: T/E/Mi/den.: 9.07/1.3/744/1.91.

EXAMPLE IX

This example illustrates the preparation of a random copolyamide from p-aminobenzoyl chloride hydrochloride, p-phenylenediamine, and terephthaloyl chloride and the preparation of fibers therefrom.

Copolymer Preparation

A one-liter resin-making kettle equipped with a shear disc stirrer, nitrogen-inlet tube, and calcium chloride drying tube is vented with nitrogen and flamed. This apparatus is placed in a dry-box and p-aminobenzoyl chloride hydrochloride (62.22 g., 0.324 mole) is added to the kettle. The apparatus is removed from the dry-box, cooled in ice, and vigorous stirring initiated. TMU (352 ml., cooled in an ice bath) is rapidly poured into the kettle whereupon immediate solution of the contents occurs. A mixture of p-phenylenediamine (3.89 g., 0.036 mole) and terephthaloyl chloride (7.31 g., 0.036 mole), previously ground up together in a mortar and stored in a sealed Erlenmeyer flask, is immediately added to the kettle. The contents of the vessel are stirred together, with cooling, for 15 min. and for an additional 2.25 hrs. after the cooling bath is removed. The contents of the vessel are then poured into a blender and stirred at high speed with water for 5 min. to precipitate the copolymer. This product is collected by filtration, washed by stirring with water in a blender (3 separate 5 min. washes, the product being collected each time), after which it is washed once by stirring for 3 min. with alcohol in a blender. The copolyamide is isolated and dried at 90° C. in a vacuum oven for 16 hrs.; the yield is 47 g., $\eta_{inh}=1.40$.

Dope preparation

Into a 500 ml. resin-making kettle equipped with a shear disc stirrer, condenser, and drying tube are placed 30 g. of the copolyamide and 270 g. of TMU/lithium chloride solution containing 6.54% by weight of the salt. The kettle and its contents are successively cooled in solid carbon dioxide for 2 hours, heated and stirred at 125° C. for 2 hours, cooled in solid carbon dioxide for 2 hours, (no stirring), heated and stirred at 125° C. for 15 hours, cooled in solid carbon dioxide for 2 hours (no stirring), heated and stirred at 130° C. for 5 hours and at 120° C. for 15 hours, after which sufficient TMU is evaporated to produce a spinning dope containing 13% of the copolyamide.

Fiber preparation by dry spinning

The dope as prepared above is heated to about 110° C. and extruded under a pressure of 80–85 lb./in.$^2$ (5,625–5,660 g./cm.$^2$) through 6 holes of 0.004 in. (0.01 cm.) diameter of a heated (119° C.—125° C.) spinneret into a drying column whose walls are kept within the range of 198° C.–207° C. The column is swept with a cocurrent flow (4.75 ft.$^3$/min.; 0.135 m.$^3$/min.) of dry nitrogen which enters the column at 235° C. A finish solution is applied to the emerging filaments which are wound upon a bobbin at the rate of about 200 yd./min. (183 m./min.). This constitutes a spin stretch factor of 4.4. The bobbin is soaked in two changes of distilled water (25° C.). The water-leached, air-dried (70° F., 65% R.H.) filaments exhibit crystallinity, an orientation angle of 25°, and the following tensile property values: T/E/Mi/den.: 8.66/3.1/426/3.37.

Heat treatment of fibers

The filaments or yarn prepared as above are passed taut in a single stage operation over a 3 inch (7.62 cm.) plate maintained at 440° C. under a nitrogen atmosphere. Residence time over the hot plate is about 4 seconds. The resulting filaments exhibit high crystallinity, an orientation angle of 11°, and the following tensile property values: T/E/Mi/Den.: 11.2/1.7/725/2.98.

EXAMPLE X

This example illustrates the preparation of a tough film of a copolyamide similar to that of Example IX.

A 10% copolymer dope is prepared by first combining 0.5 g. of the random copolyamide prepared from p-aminobenzoyl chloride hydrochloride, p-phenylenediamine, and terephthaloyl chloride (90/10/10 mole basis) $\eta_{inh}=1.03$, prepared in a manner similar to that of Example IX, with 4.5 g. of TMU/lithium chloride solution containing 6.54% by weight of the salt. After subjecting the combined ingredients to cooling with solid carbon dioxide for one hour followed by heating and stirring at 140° C. for two hours, a homogeneous dope is obtained. This dope is spread on a "Teflon" plate, immersed, washed, and dried under restraint by the procedure of Example XI to form a strong, cohesive, self-supporting transparent film.

EXAMPLE XI

This example demonstrates the preparation of a tough film of poly(p-benzamide) by one embodiment of this invention.

A 5% polymer dope is prepared by first combining 0.25 g. of poly(p-benzamide) ($\eta_{inh}=1$, average peak height ratio=0.77, prepared by the general process of Example I) and 4.75 g. of TMU/lithium chloride solution containing 6.54% by weight of the salt. After subjecting the combined ingredients to two cycles of cooling with solid carbon dioxide (1 hr./cycle), followed by heating at 140° C. (2 hr./cycle), with constant stirring throughout, there is obtained a clear, almost colorless dope. This dope is spread on a "Teflon" plate with a coating knife having a clearance of 0.005 inch (0.127 mm.). The coated plate is immersed in two changes of distilled water. The set film and plate are removed from the bath, covered with a paper towel, and dried under restraint in a press at 150° C. under a pressure of 313 lb./in.$^2$ (220,061 kg./m.$^2$) for 5 minutes. A tough, cohesive, self-supporting colorless transparent film is obtained.

Another sample of poly(p-benzamide) ($\eta_{inh}=1.53$, peak height ratio=0.74, prepared by the general process of Example I) is formed into a 10% dope in TMU/LiCl and cast into film by the method of the preceding paragraph. The tough flexible film has a tenacity of $3.24 \times 10^4$ p.s.i. ($2.28 \times 10^6$ g./cm.$^2$), elongation of 1.1%, and initial modulus of $3.86 \times 10^6$ p.s.i. ($2.71 \times 10^8$ g./cm.$^2$).

EXAMPLE XI-A

Examples of copolymers prepared from p-aminobenzoyl chloride and cointermediate reactants are listed below. In the table is given the cointermediates, their proportion (the remainder being p-aminobenzoyl chloride hydrochloride) and the inherent viscosity of the copolymer.

TABLE VIII

| Item | Cointermediates | Mole percent | $\eta_{inh}$, $H_2SO_4$ |
|---|---|---|---|
| a | Benzidine/terephthaloyl chloride | 5/5 | 1.38 |
| b | 1,3-phenylenediamine/sebacyl chloride | 9/9 | 1.01 |
| c | 1,3-phenylenediamine/isophthaloyl chloride | 9/9 | 0.73 |
| d | 1,3-phenylenediamine/5-chloroisophthaloyl chloride | 9/9 | 1.00 |
| e | do | 5/5 | |
| f | do | 2.5/2.5 | 1.04 |
| g | 4-methyl-1,3-phenylenediamine/terephthaloyl chloride | 5/5 | 0.59 |
| h | do | 9/9 | 0.48 |
| i | N,N'-diaminopiperazine/terephthaloyl chloride | 9/9 | 0.40 |
| j | Isophthaloylhydrazide/terephthaloyl chloride | 5/5 | 0.82 |
| k | Isophthaloylhydrazide/isophthaloyl chloride | 5/5 | 0.88 |
| l | do | 9/9 | 0.62 |
| m | 1,3-phenylenediamine/1,3-benzenedisulfonyl chloride | 5/5 | 0.57 |
| n | 1,4-phenylenediamine/bis(4-isocyanatophenyl)-methane | 5/5 | 0.46 |
| o | do | 9/9 | 0.63 |
| p | 1,4-phenylenediamine/pyromellitic anhydride | 5/5 | 0.54 |
| q | Bis(4-aminophenyl)ether/pyromellitic anhydride | 5/5 | 0.46 |
| r | do | 9/9 | 0.63 |

Thus, the copolymers prepared in Items a–r, above, variously contain appropriate repeating units of the types shown below for specific items in the amounts previously indicated.

TABLE IX

| Item | Repeating units | | |
|---|---|---|---|
| (a) | H-N-⟨C6H4⟩-⟨C6H4⟩-N-H | -C(O)-⟨C6H4⟩-C(O)- | -C(O)-⟨C6H4⟩-N-H |
| (i) | H-N-N-⟨C6H4⟩-N-N-H | -C(O)-⟨C6H4⟩-C(O)- | Same as above. |
| (j) | H-N-N-C(O)-⟨C6H4⟩-C(O)-N-N-H | -C(O)-⟨C6H4⟩-C(O)- | Do. |
| (m) | H-N-⟨C6H4⟩-N-H | -SO₂-⟨C6H4⟩-SO₂- | Do. |
| (n) | H-N-⟨C6H4⟩-N-H | -C(O)-N(H)-⟨C6H4⟩-CH₂-⟨C6H4⟩-N(H)-C(O)- | Do. |
| (r) | H-N-⟨C6H4⟩-O-⟨C6H4⟩-N-H | -C(O)-⟨C6H4(HOOC→COOH)⟩-C(O)- | Do. |

NOTE.—(→ indicates isomerism).

Other copolyamides of this invention, that may be prepared by the reaction of p-aminobenzoyl chloride hydrochloride with appropriate AA and BB cointermediates, selected from the groups previously given and used in mole percentage similar to Items a–r, above, by the processes exemplified herein, have repeating units of the type shown below:

benzoyl chloride hydrochloride (51.84 g.) is added and the closed vessel cooled in the hood with ice and water; while the solid is stirred, TMU (293.6 ml.) is added. After 15 min. of stirring, 1.62 g. of p-phenylenediamine are added; then after 5 min., 2.91 g. of pyromellitic dianhydride are added. The stirred mixture slowly becomes a light yellow, viscous dope. After 2 hrs. of re-

TABLE X

| Item | Cointermediates | Repeating units | | |
|---|---|---|---|---|
| s | Hydrazine/isophthaloyl chloride. | -N(H)-N(H)- | -C(O)-⟨C6H4⟩-C(O)- | -C(O)-⟨C6H4⟩-N-H |
| t | 3,3'-diaminobenzidine/bibenzoyl chloride. | H-N-⟨C6H3(H₂N)⟩-⟨C6H3(NH₂)⟩-→N-H | -C(O)-⟨C6H4⟩-⟨C6H4⟩-C(O)- | Same as above. |
| u | 1,2,4,5-tetraaminobenzene/naphthalene-1,4,5,8-tetracarboxylicdianhydride. | H-N-⟨C6H2(H₂N)(→NH₂)⟩-→N-H | -C(O)-⟨naphthalene(HOOC→COOH)⟩-→C(O)- | Do. |
| v | 3,3'-dihydroxybenzidine/terephthaloychloride. | H-N-⟨C6H3(OH)⟩-⟨C6H3(OH)⟩-N-H | -C(O)-⟨C6H4⟩-C(O)- | Do. |
| w | 3,3'-dihydroxybenzidine/methylene bis (4-phthalic anhydride). | Same as above | -C(O)-⟨C6H3(HOOC)⟩-CH₂-⟨C6H3(COOH)⟩-→C(O)- | Do. |

NOTE.— → indicates isomerism.

The following examples illustrate the preparation of fibers from copolymer prepared from p-aminobenzoyl chloride hydrochloride and AA–BB intermediate reactants.

EXAMPLE XII

A 1-liter resin kettle fitted with a glass stirrer and "Teflon" blade, nitrogen bleed and a drying tube, is flamed free of moisture and placed in a dry-box. 4-aminoaction this viscous dope is poured into stirred water in a large blender. By a series of filtrations and water washings in the blender, a fine granular product is obtained which, when dry, weighs 36.7 g. and has an inherent viscosity of 0.54 in concentrated sulfuric acid.

A spinning dope is formed by heating the polymer with TMU and LiCl at 125° C. The solution had a weight ratio of polymer-TMU-LiCl of 12–82.3–5.7.

Fibers were dry-spun under the following conditions:

Adapter temperature—125° C.
Head temperature—130° C.
Pressure, p.s.i.—80 (5.6×10³ g./cm.²)
Dope delivery—4.8 ml./min.
Spinneret—10 holes x 0.004" (0.01 cm.) diameter, each, at 141° C.
Column temperature—235–226° C.
Rate of $N_2$ flow—4.5 cu. ft./min. (0.127 m.³/min.)
Wind-up speed—140 y.p.m. (128 m./min.)
Finish—Water and detergent The fiber is extracted for two days with changes of water, then air dried. The fiber (boiled off) has the following properties: T=2.46; E=1.1; Mi=240 and den.=2.70. Dry fibers passed over (in contact with) a hot plate in air at 440° C. display the following properties: T=3.1; E=1.0; Mi=322 and den.=2.86.

EXAMPLE XIII

In a vessel, as described in the preceding example, are placed 375 ml. of pure dioxane, 8.85 g. of 5-chloroisophthaloyl chloride, and 64.80 g. of p-aminobenzoyl chloride hydrochloride. This mixture is vigorously stirred and cooled with ice and a solution of 4.05 g. of m-phenylenediamine in 375 g. of pyridine is added rapidly. The suspension becomes orange in color and the color gradually fades to off-white in about 2 hr. The precipitate of polymer is collected and washed three times with water by stirring in a blender and filtering. A final wash with ethanol is used and the polymer is dried. The yield is 50.5 g. and the inherent viscosity is 0.64.

The polymer is dissolved in DMAc and LiCl at 120° C. to form a clear viscous spinning dope containing 18% polymer and 5.33% LiCl.

Fiber is obtained by dry-spinning under the following conditions:

Adapter temperature—120° C.
Head temperature—120° C.
Pressure, p.s.i.—300–600
Dope delivery—2.3 ml./min.
Spinneret—5 holes x 0.005" (0.127 mm.) diameter, each, at 124–128° C.
Column temperature—214–203° C.
Rate of $N_2$ flow— 5 cu. ft./min. (0.142 m.³/min.)
Wind-up speed—102 y.p.m. (93.3 m./min.)
Finish—Water and detergent The wet fiber is extracted with water until salt-free, then is air dried. The T/E/Mi values for these fibers after boil off were 1.0/8.0/51. After drawing the fibers 2.2× at 360° C., T/E/Mi are 3.2/2.0/234. The orientation angle of the fiber is 16°.

EXAMPLE XIV

Polymer preparation

A 250-ml. round-bottomed flask equipped with a stirrer, nitrogen inlet tube, and calcium chloride drying tube is flamed with a Bunsen burner and simultaneously flushed with nitrogen. The dry flask with its attachments is placed in a dry-box and 11.52 g. of p-aminobenzoyl chloride hydrochloride is added. The flask is then attached to a stirring motor and nitrogen source and stirring and slow nitrogen flow started while the flask is cooled in an ice bath. Cold TMU (58.7 ml.) is added quickly in a single portion. The monomer immediately dissolves and polymerization starts. Stirring is continued for 2 hours with ice cooling and for 2 hours without cooling. The forming polymer yields a viscous, somewhat hazy dope. Polymer is isolated from a sample of the dope at 4 hours by precipitation in water and is found to have an inherent viscosity of 1.38.

Preparation of film

A sample of the polymer dope described above is cast into film by spreading on a flat "Teflon" fluorocarbon sheet with a 0.005" (0.127 mm.) doctor knife. The sheet and coating is immersed in water and, after coagulation of the dope, the resulting film is washed in several changes of water. The film is dried by pressing and heating it between the "Teflon" sheet and a paper towel at about 312 p.s.i. 21.9×10⁴ kg./m² for 5 minutes at 125° C. The film is bright, essentially colorless and flexible.

Fiber preparation

A sample of polymer dope, prepared as described above but from a duplicate reaction mixture, is charged into a 15-ml., syringe-type cell having a mechanically driven plunger and being constructed of stainless steel. A 20-hole spinneret, having 0.003" (0.076 mm.) holes and constructed of a platinum alloy, is attached to the syringe by a ring-nut over a simple filter pack consisting of a 200-mesh stainless steel screen, a thin layer of fine glass wool and then 50-mesh, 200-mesh, and 50-mesh screens in succession. The dope is extruded at a slow rate into a water bath kept at about 50° C. and the fibers are collected on a bobbin at a speed of 61 ft./min. (18.6 m./min.) after traveling in the bath for about 3 ft. (.91 m.). The fibers have the following properties:

TABLE XI

| Treatment | Den. | T | E | Mi |
|---|---|---|---|---|
| Washed and air-dried | 5.67 | 3.8 | 4.1 | 221 |
| Heated at 440° C., 4 sec. under $N_2$ | 4.86 | 5.8 | 1.0 | 619 |
| Heated at 530° C., 2 sec. under $N_2$ | 5.05 | 6.7 | 1.2 | 577 |

The polymer of the as-spun fiber has an $\eta_{inh}$ of 1.12 and a peak height ratio of 0.78.

EXAMPLE XV

Polymerization: All glassware is first dried at 160° C. for 15 hr. and cooled to room temperature in a dry box prior to use. In the dry box 10 g. (0.052 mole) of p-aminobenzoyl chloride hydrochloride is placed in a 3-necked, 500-ml., round-bottomed flask fitted with a nitrogen bleed, a stirrer and a drying tube outlet. The apparatus is removed from the dry box and connected to an electric stirring motor and a dry nitrogen source. Tetramethylurea (120 g.) cooled to −10° C. is added to the cooled reaction vessel and stirring is initiated. After complete dissolution of the p-aminobenzoyl chloride hydrochloride the system is allowed to warm to ambient temperature and then heated to about 50° C. with a hot water bath. After 30 to 60 min. at this temperature, a viscous casting dope is formed. A portion of the dope is added to water in a running blender and the precipitated polymer is washed with water and ethanol and dried in a vacuum oven at 80° C. with a nitrogen bleed. The inherent viscosity of the polymer is 1.4 or higher.

Film casting

The viscous polymerization dope is cast at once on glass plates using a 0.015" (0.381 mm.) doctor knife. The spread dopes are treated by two different techniques, both of which lead to clear, creasable films having high modulus. The first technique consists of placing the dope-coated glass plate directly in a forced draft oven at 130° C. to 160° C. After about 65 hr. the film is removed from the cooled glass plate by immersion in water. It is then blotted and air dried. The second method consists of immersing the freshly coated glass plate directly in water at about 25° C. After about 3 min. under water the gelled film is spontaneously released from the plate. This swollen film is clamped to a "Teflon" FEP-fluorocarbon film-covered plate and dried in a forced draft oven at 130° to 160° C. After drying for about 65 hr. a clear, tough, flexible film is obtained.

Film characterization

Films prepared by the above techniques have essentially equivalent physical properties. For example, such a film is found to have density of 1.39 g./cc., a tenacity of $3.0 \times 10^4$ p.s.i. ($2.1 \times 10^6$ g./cm.$^2$), elongation of 1.5%, and an initial modulus of $2.5 \times 10^6$ p.s.i. ($1.76 \times 10^8$ g./cm.$^2$). An orientation measurement, using the infrared band at 1020 cm.$^{-1}$ in a procedure similar to that of Schmidt (Journal of Polymer Science, Al, 1271 [1963]), shows that the polymer chains in the film have an unusually high degree of uniplanar orientation. The film described in Example XI likewise has high uniplanar orientation of the polymer chains. This uniplanar orientation with diffraction planes parallel to the plane of the film is further supported by X-ray patterns.

Some of the dopes of this invention may be further characterized by their microscopic birefringent qualities which are manifested by their effect on plane-polarized light. Such an observation may be made by the following method. A drop taken from the interior of a dope sample of this invention is put on a dry, clean strain-free glass slide; a square cover of glass, supported on one edge by a glass tube or wire of known thickness (1.3 mm. diameter is convenient) is pressed down on the drop so as to form the roof of a liquid wedge. The edges are sealed with a fast-drying binder avoiding actual contact with the dope. The sharp edge of the wedge is sealed by excess dope which is squeezed out. In the operation, common care should be taken to avoid evaporation, moisture uptake, excessive shearing actions, dirt, and any suspended solid particles.

The wedge is positioned in a light beam, on a microscope stage between crossed polarizer and analyzer, so that the thickness of the center of the layer of dope through which the light beam passes is $80\mu$ in thickness. The intensity is measured with polarizer and analyzer crossed ($I_+^s$) (superscript $s$ to denote sample present in wedge) and with analyzer removed ($I_-^s$) and the difference $I_-^s - I_+^s$ is obtained. The transmitted light may be measured by conventional light sensitive detectors (e.g. by photo miltipliers, selenium or cadmium light meters, bolometers, etc.). The same measurements are then made on a similarly constructed wedge containing air, and the difference $I_-^c - I_+^c$ (superscript $c$ for control) is recorded. When these dopes of this invention are placed in the wedge, the expression $(I_-^c - I_+^c) - (I_-^s - I_+^s)$ will be greater than zero, and greater than can be accounted for by experimental error. It represents the increase in light transmittance through the analyzer due to the presence of the sample. The magnitude of $(I_-^c - I_+^c) - (I_-^s - I_+^s)$ will vary with the solvent being used, polymer concentration, and concentration of dissolved salt, and the units in which light intensity is measured.

EXAMPLE XVI

The results presented in the following Table XII illustrate the effects of using various chain terminators, with and without added lithium hydroxide monohydrate, in preparing the poly(p-benzamide) of this invention. Data for two control runs are also presented.

In each of these polymerizations, 200 ml. of TMU are placed in an ice-cooled glass reaction vessel and 0.0025 mole of the designated terminator is added thereto. To these ingredients are added 32 g. (0.17 mole) of p-aminobenzoyl chloride hydrochloride. The contents of the reaction vessel are stirred for 15 minutes, after which the cooling bath is removed and the contents stirred for another 1.75 hr. Lithium hydroxide monohydrate (12.8 g., 0.31 mole) is added to the vessel and the contents are stirred for 30–60 minutes at autogenous temperature. The reaction mixture is then permitted to stand for 20 hr. at autogenous temperature before being agitated with water in a blender to precipitate the polymer. The latter is collected, washed three times with water and once with 2B alcohol (all done in a blender), and dried in a vacuum oven. The particular terminator employed, the polymer's viscosity, and presence or absence of lithium hydroxide monohydrate are indicated in appropriate columns of Table XII.

TABLE XII

| Item | Terminator | LiOH.H$_2$O | $\eta_{inh}$ of poly (p-benzamide) |
|---|---|---|---|
| 1 | None | Yes | 1.9 |
| 2 | do | Yes* | 1.67 |
| 3 | Butylamine | No | 1.68 |
| 4 | do | Yes | 1.56 |
| 5 | Piperidine | No | 1.57 |
| 6 | do | Yes | 1.52 |
| 7 | p-Phenylenediamine | Yes | 1.67 |
| 8 | Terephthalic hydrazide | Yes | 1.88 |
| 9 | do | Yes* | 1.49 |
| 10 | Cyclohexylamine | Yes | 1.67 |
| 11 | do | No | 2.07 |

*Added 1 hr. after monomer addition instead of 2 hr. later.

EXAMPLE XVII

This example illustrates that some dopes of this invention cause an increase in the transmittance of light through crossed polarizers.

In this example, the apparatus by which the anisotropic character of these dopes is determined consists essentially of an A. O. Spencer orthoscope illuminator which contains a tungsten overvoltage microscope lamp (color temperature 3800° K.), an optical wedge containing the sample, an optical wedge containing air, a Bausch and Lomb Polarizing Microscope having a Leitz 10X objective and a Leitz 10X occular Periplan, a Polaroid MP3 Industrial Land Camera and a Gossen "Sinarsix" exposure meter. The wedge containing the sample is prepared as previously described and is positioned on the microscope stage (i.e., between the polarizer and the analyzer) to provide a sample layer of $80\mu$ thickness in the path of any light which reaches the analyzer and the light meter. The polarizer and the analyzer are adjusted to provide 90° crossed polarization planes. Light from the lamp which passes the analyzer by the route previously described is projected into the camera and is measured in the image plane (at the ground glass level) by the exposure meter ($I_+^s$). The same measurement is made with the analyzer removed ($I_-^s$). This is repeated with the control wedge of air $80\mu$ thick to give $I_+^c$ and $I_-^c$. The light readings from the "Sinarsix" exposure meter may be converted to light intensities by multiplying them by 0.301 (i.e. by log 2) and then determining the antilog$_{10}$ of this product. These values are designated $I_+^{s\prime}$, $I_-^{s\prime}$, $I_+^{c\prime}$, and $I_-^{c\prime}$. The expression $I_+^{s\prime}/I_-^{s\prime}$ is the ratio of light intensities transmitted by the dope being examined. The ratio $I_+^{c\prime}/I_-^{c\prime}$ is the ratio of light transmitted by the control wedge. The difference $$(I_+^{s\prime}/I_-^{s\prime}) - (I_+^{c\prime}/I_-^{c\prime})$$

represents the increase in intensity of light transmitted due to the presence in the wedge of the dope being examined.

Since the theoretical maximum value of $$I_+^{s\prime}/I_-^{s\prime} - I_+^{c\prime}/I_-^{c\prime} = 0.5$$

an index of the increase of light transmittance may be conveniently taken as $2(I_+^{s\prime}/I_-^{s\prime} - I_+^{c\prime}/I_-^{c\prime}) \times 100$ since in this way, the maximum value is 100. When measured according to the foregoing procedures, dopes having values greater than 2 are considered herein to be anisotropic in nature.

Shown in the following Table XIII are data determined by the above described procedure on typical dopes of this invention. The symbol T is used for the value obtained from the expression $2(I_+^{s\prime}/I_-^{s\prime} -_+^{c\prime}/I_-^{c\prime}) \times 100$. All dopes are in TMU unless otherwise specified. Each dope sample shown in Table XIII contains lithium chloride.

TABLE XIII

Light depolarization by poly(p-benzamide) and copolymer dopes

| | Poly(p-benzamide) | | | |
|---|---|---|---|---|
| Item | $\eta_{inh}$ | Wt. percent in dope | Wt. percent salt | T |
| 1 | 0.7 | 10 | 5.9 | 30 |
| 2 | 1.4 | 5 | 3 | 47 |
| 3 | 1.14 | 5 | 3.2 | 53 |
| 4 [1] | 1.12 | [2] 10 | 6 | 11 |

[1] Copoly(p-benzamide/m-benzamide) (95/5 by weight).
[2] Amide medium is N,N-dimethylacetamide.

EXAMPLE XVIII

This example illustrates the preparation of 4-(3'-aminobenzamido) benzoyl chloride hydrochloride.

As a suspension of 28 g. of 4-(3'-aminobenzamido) benzoic acid in 500 ml. of dry toluene is stirred, 60 ml. of thionyl chloride are added thereto. This reaction mixture is then heated at reflux for 2 hrs. during which time most of the solid dissolves. The solvent and excess thionyl chloride are removed by means of a rotary evaporator. The tan solid residue is dissolved in 500 ml. of dry toluene at the boil. The toluene solution is filtered through a sintered glass funnel and the filtrate is cooled to room temperature whereupon a pale yellow precipitate forms. The precipitate is collected, washed with hexane, and dried in a desiccator under vacuum. The yield of 4-(3'-thionylaminobenzamido) benzoyl chloride is 28 g.

The above-described thionylaminobenzoyl chloride is dissolved in 300 ml. of tetrahydrofuran. The almost perfectly clear solution is added to 1,500 ml. of ether saturated with anhydrous hydrogen chloride. A white precipitate forms immediately. Anhydrous hydrogen chloride gas is passed over the solution for 2 hrs., after which the resulting precipitate is collected under nitrogen on a sintered glass funnel and washed with ether and methylene chloride. This solid is dried under vacuum to yield 20 g. of 4-(3'-aminobenzamido) benzoyl chloride hydrochloride.

EXAMPLE XIX

This example presents a further illustration of the preparation of copoly(p-benzamide/m-benzamide) and the preparation of filaments therefrom.

This polymerization is run under the conditions described in Example VII. p-Aminobenzoyl chloride hydrochloride (17.28 g., 0.09 mole) and 4-(3'-aminobenzamido) benzoyl chloride hydrochloride (3.11 g., 0.01 mole) are combined and cooled in ice. Dry, ice-cooled N,N-dimethylacetamide (100 ml.) is added to this combination and the resulting mixture is rapidly stirred with an "egg beater" type stirrer. A transient solution forms which sets up in 20 minutes to an unstirrable white mass. After reaction mixture is permitted to stand overnight, it is poured into water. The precipitated polymer is isolated, washed 5 times with water and once with 2B alcohol in a blender. The product is dried at 80° C. in a vacuum oven to produce copoly(p-benzamide/m-benzamide) (91/9), 12.3 g.; $\eta_{inh}$=0.82.

A 9% solids spinning dope of the above-described copolymer is prepared by heating on the steam bath for 10 minutes, with vigorous stirring, a mixture of 9.0 g. of the copolymer and 91 g. of a mixture of N,N-dimethylacetamide and lithium chloride (95/5). The stirred mixture is then cooled with an ice bath. Finally the mixture is stirred at room temperature overnight and there results a viscous, clear dope. This dope is extruded into a warm water bath using a small hypodermic syringe-type apparatus. The fiber produce is extracted with water, dried, and heat treated in a nitrogen atmosphere. Presented below in Table XIV are the tensile properties of the fiber produced by this procedure.

TABLE XIV

| Item | Fiber heating conditions, °C. | Fiber properties | | |
|---|---|---|---|---|
| | | T | E | Mi |
| 1 | ([1]) | 1.1 | 17.7 | 56 |
| 2 | 480 | 3.9 | 1.0 | 428 |
| 3 | 525 | 5.4 | 1.2 | 466 |

[1] None; as-extruded.

EXAMPLE XX

This example illustrates the preparation of copoly(1,4-benzamide/3,5-dimethyl-1,4-benzamide) and the preparation of filaments therefrom.

p-Aminobenzoyl chloride hydrochloride (17.28 g., 0.09 mole) and 3,5-dimethyl-4-aminobenzoyl chloride hydrochloride (2.20 g., 0.01 mole) are combined in a resin kettle. Ice-cooled tetrahydrofuran (10 ml.) and hexamethylphosphoramide (100 ml.) are added, in order, with stirring, to the combined comonomers. The contents of the resin kettle are stirred for 1 hr. at ice temperature and for 1 hr. at room temperature. They are then permitted to stand overnight at room temperature without stirring, whereupon the contents solidify. The polymer is precipitated by pouring the reaction vessel contents into water. The polymer is isolated, washed 5 times with water and once with 2B alcohol in a blender, and dried at 80° C. in a vacuum oven. There is obtained copoly(1,4-benzamide/3,5-dimethyl-1,4-benzamide), 11.5 g., $\eta_{inh}$=1.63.

The above-described copolyamide (9.6 g.) and 87 g. of tetramethylurea/lithium chloride (93/7, by weight) are combined in a resin kettle and heated, with stirring, in a 1335° C. oil bath. A stiff gel is produced in 20 minutes. The oil bath is removed and replaced with a solid carbon dioxide bath in which the reaction vessel and contents are cooled for 0.5 hr. The resin kettle and contents are again immersed in a 135° C. oil bath and stirred for 4 hours. This produces a mobile fluid containing undissolved, gel-like particles. The reaction vessel and contents are again cooled as before, then permitted to stand at room temperature overnight. The resulting composition is reheated, frozen, reheated, frozen, and reheated as above to produce a spinnable composition.

The composition is spun at the rate of 1.75 ml./min. through a 5-hole spinneret, each hole of 0.004 inch (0.01 cm.) diameter, into a drying column whose walls are kept at about 200° C. and which is swept with a cocurrent flow (4.5 ft.$^3$/min.; 0.119 m.$^3$/min.) of dry nitrogen which enters the column at 265° C. As the resulting yarn is wound up at about 137 yd./min., (125.5 m./min.) a finish composition, consisting of water and detergent, is applied to it. The bobbin of yarn is soaked in distilled water over the weekend and again in fresh water for 24 hours. The yarn is dried in warm air and heat treated by being passed by hand over a heated plate in a nitrogen atmosphere. The various fiber samples exhibit the properties shown below in Table XV.

TABLE XV

| Item | Fiber heating conditions, °C. | Fiber properties | | | Orient. angle, degree |
|---|---|---|---|---|---|
| | | T | E | Mi | |
| 1 | ([1]) | 7.4 | 3.0 | 388 | 28 |
| 2 | 450 | 10.6 | 1.8 | 595 | 13 |
| 3 | 480 | 9.8 | 1.8 | 600 | 12 |
| 4 | 530 | 9.7 | 1.5 | 688 | 12 |

[1] None, as extruded.

EXAMPLE XXI

This example illustrates the preparation of p-(chlorocarbonyl)-phenyl p-(amino)benzoate hydrochloride.

Part A

To a solution of benzyl p-hydroxybenzoate (91.2 g., 0.4 mole) in 1,200 ml. of dry pyridine is added sublimed p-nitrobenzoyl chloride (74.16 g., 0.4 mole). The resulting solution is heated on a steam bath for 3 hrs., then permitted to stand overnight at room temperature. The solution is poured into 5 l. of water. The white precipitate which forms is collected and dried at 60° C. under vacuum. The crude product (146 g.) is recrystallized from about 4.1 of absolute alcohol. There is obtained 132 g. of crystalline benzyl p-[(p-nitrobenzoyl)oxy]benzoate, M.P. 113–115° C.

*Analysis.* — Calculated for $C_{21}H_{15}NO_6$ (percent): C, 66.83; H, 4.01; Found (percent). C, 66.82, H, 3.90.

Part B

The nitro ester prepared above (75 g.) is reduced with hydrogen at 80° C. and 100 lbs. per sq. inch pressure, using dioxane as a solvent and 5% palladium on carbon as a catalyst. The reaction product is isolated by filtering the hot dioxane solution free of suspended catalyst, cooling the filtrate in ice, and collecting the solid precipitate which forms. There is obtained 34 g. of p-carboxyphenyl p-aminobenzoate.

*Analysis.*—Calculated for $C_{14}H_{11}NO_4$ (percent): C, 65.36; H, 4.31. Found (percent): C, 65.40; H, 4.31.

This reduction may also be performed at the above-cited temperature and pressure, using acetic acid as a solvent and platinum oxide as a catalyst.

Part C

To a stirred suspension of 20 g. of the product prepared in Part B, above, in 400 ml. of dry toluene are added 50 ml. of thionyl chloride. The resulting mixture is heated at reflux with stirring for 1.5 hr., after which the solvent and excess thionyl chloride are removed on a rotary evaporator. This treatment produces p-(chlorocarbonyl)phenyl p-(thionyl-amino)benzoate as a light yellow powder.

*Analysis.*—Calculated for $C_{14}H_8NO_4SCl$ (percent): N, 4.35; Cl, 11.02. Found (percent): N, 4.21; Cl, 11.32.

This material is dissolved in 400 ml. of methylene chloride in a dry box. The solution is filtered and the filtrate immediately converted to the corresponding amine hydrochloride.

Part D

The filtered methylene chloride solution from Part C, above, is added rapidly to 1500 ml. of ether saturated with anhydrous hydrogen chloride gas. A white precipitate forms immediately. Anhydrous hydrogen chloride gas is passed over the suspension for 2.5 hr., after which the product is collected on a filter in a nitrogen atmosphere. The precipitate is washed with ether and dried at room temperature under vacuum to produce 13.6 g. of p-(chlorocarbonyl)phenyl p-(amino)benzoate hydrochloride.

*Analysis.*—Calculated for $C_{14}H_{11}NO_3Cl_2$ (percent): N, 4.48; Cl, 22.71. Found (percent): N, 3.98; Cl, 22.9.

EXAMPLE XXII

This example illustrates the preparation of copoly[(iminocarbonyl-p-phenylene)/(oxycarbonyl - p - phenyleneiminocarbonyl-p-phenylene)] and the preparation of filaments therefrom.

A resin kettle is equipped with a stirrer, drying tube, nitrogen inlet, and is connected to an air-driven stirrer. The kettle is charged with p-aminobenzoyl chloride hydrochloride (17.28 g., 0.09 mole) and p-(chlorocarbonyl) phenyl p-(amino)benzoate hydrochloride (3.12 g., 0.01 mole) in a dry box. These reactants are mixed together by stirring and are cooled in ice. Dry, ice-cooled N,N-dimethylacetamide (100 ml.) is added at once with rapid stirring. In about 30 minutes the reaction mixture sets up to an unstirrable, hazy mass. After the reaction mixture is permitted to stand overnight at room temperature, water is added to stop the reaction. The contents of the reaction vessel are agitated with water in a blender to precipitate the polymer. The polymer is collected, washed 5 times with water and once with 2B alcohol in a blender, and dried overnight at 80° C. in vacuum. There is obtained copoly[(iminocarbonyl - p - phenylene)/(oxycarbonyl-p-phenylene)] (91/9), 12.7 g., comprised of repeating units selected from the group of

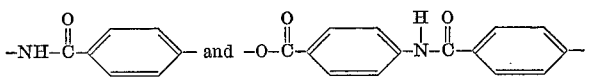

A 5 percent solids spinning dope is prepared by first adding 1.5 g. of the above-described copolyamide to 28.5 g. of a mixture of tetramethylurea/lithium chloride (94/6 by weight); this combination is stirred at 100° C. for 36 hrs. The slightly hazy, gel-like composition is then extruded into water through a 0.005 inch (0.127 mm.) diameter single hole spinneret, using a small, motor-driven wet-spinning apparatus. The resulting fiber is wound up on a bobbin, extracted with water, and dried. Small tows of this fiber are heated in a nitrogen atmosphere at 480° C. and at 525° C. Fiber properties obtained on these samples are shown below in Table XVI.

TABLE XVI

| Item | Fiber heating conditions, ° C. | Fiber properties | | | Orient. angle, degree |
|---|---|---|---|---|---|
| | | T | E | Mi | |
| 1 | (¹) | 1.7 | 11.9 | 100 | 55 |
| 2 | 480 | 4.8 | 1.0 | 592 | 20 |
| 3 | 525 | 6.9 | 1.3 | 636 | (²) |

¹ None; as extruded.
² Not determined.

End uses

The fibers of the invention are excellent for reinforced plastic laminates because of their high modulus, low density, high dimensional stability, high strength, high thermal stability and high flexural rigidity at a given laminate weight. Specific end-uses may include spiral wound pressure vessels, skis, bows, fishing rods, and golf club shafts.

The high modulus, high strength, fatigue resistance and impact strength of the fibers render them useful in mechanical rubber goods such as belts.

The fibers are useful in sewing thread and in uses such as protective clothing, laundry press covers, filtration fabrics, industrial hose, dryer felts, all of which utilize the high thermal stability of the fiber.

Reinforced plastic composites or laminates, comprised of a matrix polymer with a reinforcing amount of a fiber of this invention, are especially useful. The amount of fiber which is necessary to provide reinforcement is determined in a conventional manner, e.g., the amount will vary with the positioning thereof in the composite and the type and degree of reinforcement desired. Use of less than about 75% by weight of fiber is preferred; use of about 3 to 90% by volume of fiber is also preferred. A wide variety of conventional thermosetting and thermoplastic polymer matrices can be used, e.g., see "Handbook of Reinforced Plastics" of The Society of the Plastics Industry, Inc., S. S. Oleesky and J. G. Mohr, Reinhold, 1964. The preferred thermosetting matrices herein include phenolic (e.g., phenol-formaldehyde) polyester, epoxy (including conventional epoxy, epoxy novolak and epoxidized polyolefin) and polyamide-imide. The preferred thermoplastic matrices herein include polycarbonate, polyalkylene (e.g., polyethylene and polypropylene), polyamides and fluorocarbon (e.g., polytetrafluoroethylene). Among the other suitable thermosetting matrices may be named alkyd, melamine, urea-formaldehyde, silicone phenyl-silane polyimide and thermosetting acrylics; among the other suitable thermoplastic matrices may be named vinyls, and polystyrene [including acrylonitrile-butadiene-styrene, (known as "ABS")]. Other suitable matrix polymers, such as natural or synthetic rubber, which are either thermoplastic or thermosetting (e.g., depending on the extent of vulcanization) can be suitably reinforced with fiber of this invention for, e.g., tires. Representative composites of the present invention are illustrated in the following example.

EXAMPLE XXIII

This example illustrates the preparation of composites of poly(p-benzamide) fibers of this invention in both thermosetting and thermoplastic matrix polymers. The fibers of this invention which are used in this example are samples which have been heat treated as described herein. Part A of the example demonstrates that a strong composite is obtained when the fiber content is as low as about 3% by volume based on the composite. Parts B, C, D and E illustrate the reinforcement of phenolic, polyamide, fluorocarbon and polycarbonate matrix polymers, respectively, with fibers of this invention.

Part A 100 g. of "Epon 826" (Shell's epoxy resin) are mixed with 90 g. of "Nadic" (methyl anhydride curing agent, Allied Chemical Corp.) and 1 g. of benzyldimethylamine. Part of the mixture is poured into the cavities of two molds of the kind described in Example VI. Both cavities are filled in this manner to a uniform depth of 0.21 in. from the bottom of each cavity. The molds are heated in an oven under the following successive conditions: 3 hr. at 120° C., 3 hr. at 205° C., and 3 hr. at 260° C. The oven is then shut off and the molds allowed to cool in the oven to room temperature. They are then removed from the oven and the cured epoxy bars demolded. The two epoxy bars have dimensions of 0.210 x 0.500 x 10.75 in. (depth x width x length). One bar is sanded down to a uniform 0.200 in. depth and placed flat on a table. Poly(p-benzamide) fibers (T/E/Mi=17.2/1.75/1100) are placed on the top surface of this bar across its entire 0.50 in. width and are kept taut by securing them onto the table surface at both ends with adhesive tape; the fibers are parallel to the long axis of the bar. The portion of the fibers covering the bar weighs 0.30 g. A second epoxy resin is prepared by mixing 100 g. of "Epon-826" with 12 g. of triethylenetetramine. This resin is painted on the above-described yarn assembly with a soft brush; the painting strokes are in the long direction of the fibers and care is taken not to disturb the fiber alignment. This coating cures at room temperature for 16 hrs. The fibers extending beyond the original epoxy bar are then cut off. The bar with one skin of aligned fiber adhered to one surface is turned over and the same procedure of adfixing fiber is repeated. After the second skin has cured overnight, the bar is placed flat in an oven for 16 hrs. at 100° C. between Teflon® fluorocarbon-coated aluminum foil under a load of 380 g. distributed uniformly over the entire bar. The thickness of the bar measures 0.210 inch, i.e., two fiber-epoxy skins, each 0.005 in. thick, are added to the original 0.200 in. bar. The fiber-volume content of the bar with the laminated skins is about 3% (about 3.6% by weight). The flex modulus of the bar made of epoxy alone and of the bar with the fiber-epoxy skins are measured as described in Example VI and found to be 0.40 x $10^6$ p.s.i. for the epoxy bar and 1.50 x $10^6$ p.s.i for the bar with the laminated fiber skins. The flex modulus of the epoxy composite of Example VI [wherein the fibers comprise about 60% by volume (64% by weight) of the composite] is 14.41 x $10^6$ p.s.i.

Part B

Poly(p-benzamide) yarn (6.15 g.,

T/E/Mi=14/1.4/1036)

is peeled from a bobbin over-end, conducted through a resol of phenol formaldehyde prepared according to "Preparative Methods in Polymer Chemistry" by W. R. Sorenson and T. W. Campbell, Preparation No. 259, p. 296, Interscience Publishers, 1961, passed through rubber squeegees that remove excess resin, and passed through a drying column consisting of a 2 in. diameter glass tube 6 ft. long through which hot air at 130° C. is blown countercurrent to the yarn motion.

The yarn is wound on a bench top yarn skeiner (Alfred Suter Co., New York, N.Y.) operated by a variable speed electric drive. The linear speed of the yarn is controlled by the wind-up so that the yarn at the end of the drying tube feels dry when touched.

The resin-impregnated fiber in the form of a dry straw is cut off the skeiner and placed in the center portion of the cavity of the mold described in Example VI, with care being taken to stack the fibers substantially parallel to the long axis of the cavity. The flanged plug of the mold is inserted in the cavity and bolted tightly against the preimpregnated fibers by means of screws. The bolted mold is placed in an oven and cured 20 hrs. at 92° C., after which the temperature is raised from 92° C. to 180° C. in a period of 6 hrs. and held 18 hrs. at 180° C. The oven is then shut off. The mold is allowed to cool to room temperature in the oven and removed. The demolded composite has dimensions of 0.515 x 0.110 x 7.25 in. (width x depth x length), a density of 1.41 g./cc. and contains 62% by volume (64.7% by weight) of fiber. The flex modulus of the composite measured as described in Example VI, is 12.12×$10^6$ p.s.i. By contrast, laminates of "E" glass (having a density of 2.12 g./cc.) have a theoretical flex modulus of 6.2×$10^6$ p.s.i. at the same volume percent fiber.

Part C

An aligned fiber composite is prepared by passing poly-(p-benzamide) yarn (T/E/Mi/den.=18.2/1.6/1,400/431)

through a solution of 15% of Du Pont's Zytel® 101 nylon molding resin in formic acid and winding the resulting material into an aligned sheet configuration. The sheet is wound at 50 yarn wraps per inch. The material thus prepared is then soaked in water to precipitate the nylon from the formic acid solution onto the yarn. The yarn/resin combination is then densified by compression molding at 270° C. and 320 p.s.i. The resulting composite contains 60% by volume (65.9% by weight) unidirectional fibers. Tensile testing is performed along the fiber direction. The results show that the poly(p-benzamide) fiber composite has a modulus 30× that of bulk nylon and a strength more than 10× that of the bulk nylon. The results are:

| | Tensile strength, p.s.i. | Tensile modulus, p.s.i. |
|---|---|---|
| Nylon resin control | 9–11,000 | 0.410–0.480×$10^6$ |
| Composite | 134,000 | 17×$10^6$ |

Part D

Poly(p-benzamide) yarn (T/E/Mi/den.=14.6/1.34/1,150/566)

is treated with a dispersion prepared by adding 1% by weight of Union Carbide's Silane A–1100 gamma-aminopropyltriethoxysilane coupling agent and 0.5% by weight of Du Pont's Zytel® 63 nylon resin to a mixture of methanol/water (80/20, vol./vol.) and is then dried. After this treatment, the yarn is chopped to 3/16 inch lengths and mixed with a fluorocarbon resin (a copolymer predominantly of tetrafluoroethylene and ethylene derived units, e.g., about 50 mole percent of each type of unit) in powder form in a methanol dispersion. This mixture is filtered and dried. The dry mixture is injection molded (melt processed) at 300° C. and 1450 p.s.i. into microtensile composite [containing 12 volume percent (10.5 weight percent) yarn] bars 1½ inches long with a ¾ inch gage length and a 3/16 inch by 1/8 inch cross-section. Control samples without any fiber additions are also run. The composite bars have a density of about 1.67 g./cc. Tensile testing of these bars shows that the poly(p-benzamide) yarn reinforcement increases the tensile modulus of the unreinforced resin by a factor of greater than three. The modulus values are:

| | Tensile modulus, p.s.i. |
|---|---|
| Fluorocarbon resin control | 198×10³ |
| Composite | 650×10³ |

Part E

Another sample of the poly(p-benzamide) yarn described in Part D, above, is finished and chopped into staple as described in Part D. The staple is then mixed with a dispersion of General Electric's Grade 5029 thermoplastic polycarbonate in methanol. The mixture is filtered and the yarn-resin combination is dried, after which it is injection-molded at 320° C. and 16,000 p.s.i. into ⅝ scale tensile bars with an overall length of 5 inches, a gage section of 1.75 inches and a gage cross-section of 0.290 by 0.125 inch. The composie bars thus prepared, which contain 15 volume percent (17.7 weight percent) yarn, are tested in tension. The experimental results are:

| | Tensile strength, p.s.i. | Tensile modulus, p.s.i. |
|---|---|---|
| Polycarbonate resin control | 9,250 | 328,000 |
| Composite | 10,700 | 1,000,000 |

What is claimed is:

1. A high molecular weight substantially homopolymeric poly(p-benzamide) consisting essentially of recurring units of the formula

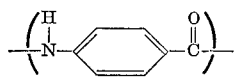

having an inherent viscosity measured in sulfuric acid at 30° C. of at least 0.7, and a peak height ratio of up to 0.86.

2. A polymer in accordance with claim 1, which leaves no sediment when 0.1 g. is combined with 10 ml. of a 6.9% by weight lithium chloride solution in tetramethylurea, mechanically agitated for 24 hours, and allowed to stand for at least 24 hours at room temperature.

3. A spinning dope consisting essentially of between about 4 and 30% by weight of the homopolymer of claim 1 from 3 to 22% by weight of lithium chloride and the remainder being tetramethylurea.

4. A method for preparing the dope of claim 3 comprising combining the ingredients with stirring and subjecting the composition to at least one heat and cool cycle.

5. A spinning dope prepared by polymerizing p-aminobenzoyl chloride hydrochloride in tetramethylurea at a temperature below 60° C.

6. A spinning dope prepared as in claim 5 wherein the hydrogen chloride produced is at least partially neutralized with a lithium salt or salt-forming reagent.

7. A copolymer consisting essentially of at least 80 mol percent of para oriented units of the formula

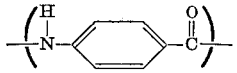

and up to 20 mol percent of

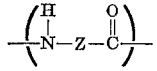

units, wherein Z represents a divalent organic radical.

8. A copolymer consisting essentially of at least 80 mol percent of para oriented units of the formula

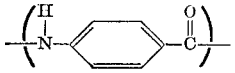

and in substantially equal amounts up to 10 mol percent of each of

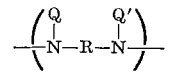

units and

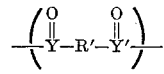

units wherein Q and Q' are selected from the group of hydrogen, methyl and phenyl radicals, R represents a divalent organic radical or a single bond, and R' represents a divalent organic radical and Y and Y' are

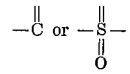

said copolymer having an inherent viscosity measured in sulfuric acid at 30° C. of at least 0.5.

9. A method for preparing the polymer of claim 1 comprising polymerizing at a temperature below 60° C. in a solvent selected from the group consisting of tetramethylurea, hexamethylphosphoramide, dimethylacetamide, N, N'-dimethylethylene urea, N,N' - dimethylpropionamide, N,N,N',N'-tetramethylmalonamide, N - methylpiperidone, N-methylcaprolactam, and N-methylpyrrolidone, p-aminobenzoyl chloride hydrochloride.

10. The process of claim 9 wherein the polymer is prepared in tetramethylurea and the resulting composition containing between about 4 and 30% by weight of polymer is spun in filament form or cast into a film.

11. The process of claim 9 wherein the polymer is prepared in tetramethylurea and the resulting composition containing between about 4 and 30% polymer in combination with from 3 to 8% by weight of lithium chloride is spun in filament form or cast into a film.

12. A fiber of a high molecular weight substantially homopolymeric poly(p-benzamide) consisting essentially of recurring units of the formula

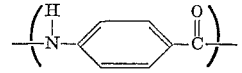

said fiber having an orientation angle of up to 35° and an initial modulus in excess of 200 g.p.d.

13. A fiber of the polymer of claim 7 having an orientation angle of up to 35° and an initial modulus in excess of 200 g.p.d.

14. A fiber of the polymer of claim 8 having an orientation angle of up to 35° and an initial modulus in excess of 200 g.p.d.

15. The polymer of claim 1 in the form of fibrids.

16. A film of the polymer of claim 1 having a high uniplanar orientation and an initial modulus of at least 1×10⁶ p.s.i.

17. A copolymer in accordance with claim 7 wherein said mol percent of para oriented units of the formula

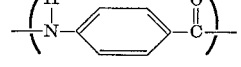

is at least 90 and said mol percent of said

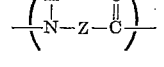

units is up to 10.

18. A copolymer in accordance with claim 7 wherein said divalent organic radical is aromatic.

19. A copolymer in accordance with claim 8 wherein said mol percent of para oriented units of the formula

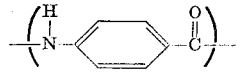

is at least 90 and said mol percent of each of said units and said 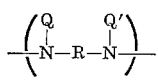

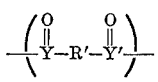 units is up to 5.

20. A copolymer in accordance with claim 8 wherein each of said divalent organic radicals is aromatic.

21. A plastic composite comprising a thermoplastic or thermosetting matrix polymer reinforced with the fiber of claim 12, said fiber comprising less than 75% by weight and between about 3 and 90% by volume, both percentages based on the composite.

References Cited

UNITED STATES PATENTS

| | | | |
|---|---|---|---|
| 3,063,966 | 11/1962 | Kwolek et al. | 260—32.6N |
| 3,079,219 | 2/1963 | King | 260—78A |
| 3,109,836 | 11/1963 | Berry | 260—78A |
| 3,133,138 | 5/1964 | Alexander | 264—290 |
| 3,150,435 | 9/1964 | McColm et al. | 264—346 |
| 3,203,933 | 8/1965 | Hoffman et al. | 260—78A |
| 3,225,011 | 12/1965 | Preston et al. | 260—78A |
| 3,414,645 | 12/1968 | Morgan | 264—210 |

FOREIGN PATENTS

| | | | |
|---|---|---|---|
| 901,159 | 7/1962 | Great Britain | 260—78A |

OTHER REFERENCES

A.P.C. Publication of Hagedorn, Ser. No. 323,512, published Apr. 20, 1943.

Hasegawa, Bull. Chem. Soc. Japan, vol. 27, 1954, pp. 327–330.

Cologne et al., Bull. T22 Soc. Chim. France, January–June 1955, pp. 412–419.

ALLAN LIBERMAN, Primary Examiner

U.S. Cl. X.R.

260—3, 30.2, 30.6, 78, 824, 830, 841, 849, 857

PO-1050
(5/69)

UNITED STATES PATENT OFFICE
CERTIFICATE OF CORRECTION

Patent No. 3,600,350    Dated August 17, 1971

Inventor(s) Stephanie Louise Kwolek

It is certified that error appears in the above-identified patent and that said Letters Patent are hereby corrected as shown below:

Column 2, line 23, "temperaure" should read -- temperature --.

Column 7, line 46, "these" should read -- those --.

Column 16, line 10, "Table II" should read -- Table III --.

Column 18, line 35, "respectivelv" should read -- respectively --.

Column 28, line 33, " '"Sinarsix" " should read -- "Sinarsix" --.

Column 35, line 18, "composie" should read -- composite --.

Column 36, Claim 8, line 15,   $-\overset{\text{"}}{\underset{\text{"}}{C}}-$ or $-\overset{\text{"}}{\underset{\text{"}}{S}}-$   should read $-\overset{\text{"}}{\underset{\text{"}}{C}}-$ or $-\overset{\text{"}}{\underset{\text{O}}{S}}-$.

Signed and sealed this 14th day of March 1972.

(SEAL)
Attest:

EDWARD M. FLETCHER, JR.        ROBERT GOTTSCHALK
Attesting Officer              Commissioner of Patents

UNITED STATES PATENT OFFICE
CERTIFICATE OF CORRECTION

Patent No. 3,600,350    Dated August 17, 1971

Inventor(s) Stephanie Louise Kwolek

It is certified that error appears in the above-identified patent and that said Letters Patent are hereby corrected as shown below:

Column 14, line 30, the last column heading in the table should read

-- Orientation 23.4° 2θ -- instead of " Orientation " (23.4°) degree

Signed and sealed this 18th day of July 1972.

(SEAL)
Attest:

EDWARD M. FLETCHER, JR.
Attesting Officer

ROBERT GOTTSCHALK
Commissioner of Patents